US010003703B2

(12) United States Patent
Kondoh

(10) Patent No.: US 10,003,703 B2
(45) Date of Patent: Jun. 19, 2018

(54) DATA PROCESSING APPARATUS AND PRINT SYSTEM

(71) Applicant: Naritake Kondoh, Kanagawa (JP)

(72) Inventor: Naritake Kondoh, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 0 days. days.

(21) Appl. No.: 15/440,304

(22) Filed: Feb. 23, 2017

(65) Prior Publication Data

US 2017/0272587 A1 Sep. 21, 2017

(30) Foreign Application Priority Data

Mar. 18, 2016 (JP) .................................. 2016-055807

(51) Int. Cl.
*G06F 3/12* (2006.01)
*H04N 1/00* (2006.01)

(52) U.S. Cl.
CPC ....... *H04N 1/00344* (2013.01); *G06F 3/1205* (2013.01); *G06F 3/1206* (2013.01); *G06F 3/1208* (2013.01); *G06F 3/1227* (2013.01); *G06F 3/1247* (2013.01); *G06F 3/1248* (2013.01); *G06F 3/1254* (2013.01); *G06F 3/1288* (2013.01); *H04N 1/0023* (2013.01); *H04N 1/00228* (2013.01); *G06F 3/126* (2013.01); *G06F 3/1219* (2013.01); *G06F 3/1239* (2013.01); *G06F 3/1255* (2013.01);
(Continued)

(58) Field of Classification Search
CPC ....... H04N 1/00344; H04N 2201/0094; H04N 2201/0039; G06F 3/126; G06F 3/1219; G06F 3/1239; G06F 3/1255

USPC ......................................................... 358/1.15
See application file for complete search history.

(56) References Cited

U.S. PATENT DOCUMENTS 8,467,080 B2 6/2013 Kamijo
9,256,387 B2 2/2016 Nishizawa
(Continued)

FOREIGN PATENT DOCUMENTS

EP 2339450 6/2011
JP 2005-202723 7/2005
(Continued)

OTHER PUBLICATIONS

Extended European search report for 17158937.7 dated Aug. 24, 2017.

*Primary Examiner* — Neil R McLean
(74) *Attorney, Agent, or Firm* — IPUSA, PLLC

(57) ABSTRACT

A data processing apparatus includes a processing unit configured to perform a process on print data or setting data of the print data by a processing method targeting print data of a specific description format; a receiving unit configured to receive print data and setting data of the print data of a description format selected by a user; a determination data obtaining unit configured to obtain determination data that indicates whether a printer driver used for inputting the received print data and the setting data is a target printer driver for the process performed by the processing unit; and a process control unit configured to determine whether to perform the process by the processing unit on the received print data or the setting data based on the obtained determination data, and control the processing by the processing unit.

17 Claims, 19 Drawing Sheets

(52) U.S. Cl.
CPC ............... *H04N 2201/0039* (2013.01); *H04N 2201/0094* (2013.01)

(56) References Cited

U.S. PATENT DOCUMENTS

| | | | | |
|---|---|---|---|---|
| 2005/0254078 | A1* | 11/2005 | Patton | G06F 3/1205 358/1.13 |
| 2009/0174894 | A1* | 7/2009 | Kamijo | G06F 21/608 358/1.15 |
| 2011/0157631 | A1* | 6/2011 | Tsutsumi | G06F 3/1205 358/1.15 |
| 2011/0273738 | A1 | 11/2011 | Tanaka et al. | |

FOREIGN PATENT DOCUMENTS

| | | |
|---|---|---|
| JP | 2010-221697 | 10/2010 |
| JP | 2012-064226 | 3/2012 |
| JP | 2014-115704 | 6/2014 |
| JP | 2015-026236 | 2/2015 |

\* cited by examiner

FIG.13

| ID | DATA PATH | JOB NAME | OWNER | NUMBER OF PAGES | ... |
|---|---|---|---|---|---|
| 1 | File://c/data/1.prn | Job1.docx | User1 | 1 | ... |
| 2 | File://c/data/2.prn | Job2.pptx | User2 | 9 | ... |
| 3 | File://c/data/3.prn | Job3.xlsx | User3 | 12 | ... |
| 4 | File://c/data/4.prn | Job4.jpeg | User1 | 3 | ... |

FIG.14

| ID | DATA PATH | JOB NAME | OWNER | DETERMINATION DATA | NUMBER OF PAGES | ... |
|---|---|---|---|---|---|---|
| 1 | File://c/data/1.prn | Job1.docx | User1 | TARGET | 1 | ... |
| 2 | File://c/data/2.prn | Job2.pptx | User2 | TARGET | 9 | ... |
| 3 | File://c/data/3.prn | Job3.xlsx | User3 | NON-TARGET | 12 | ... |
| 4 | File://c/data/4.prn | Job4.jpeg | User1 | NON-TARGET | 3 | ... |

FIG.18

```
<processes target="other">
    <processes>
        <routing type="deny" />
    </processes>
    <processes>
        <notify type="email">
            <subject>ALARM</subject>
            <body>JOB FOR PRINTER OF OTHER COMPANY CANNOT BE PRINTED</body>
            <to>$[user,mail]</cc>
        <notify/>
    </processes>
</processes >
```

DATA PROCESSING APPARATUS AND PRINT SYSTEM

CROSS-REFERENCE TO RELATED APPLICATION

The present application is based on and claims the benefit of priority of Japanese Priority Application No. 2016-055807 filed on Mar. 18, 2016, the entire contents of which are hereby incorporated by reference.

BACKGROUND OF THE INVENTION

1. Field of the Invention

The present invention relates to a data processing apparatus and a print system.

2. Description of the Related Art

A print system is known that prints print job after performing a predetermined process on the print job in a pull-printing server or a push-printing server, for example.

Conventionally, a print system is also known that applies a previously registered printing rule based on data included in a print job, and prints a document or the like of the print job based on a result to which the print rule is applied (see Patent Document 1, for example).

Recently, a print system of multi-vendor printing environment in which a plurality of printers of a plurality of vendors exist has been used. In such a print system of the multi-vendor printing environment, for example, there is a case that a printer vendor that provides a print server cannot know specification of a print job of another printer vendor. Thus, when a user hopes to have the print server perform a certain process on a print job, if a printer vendor of a printer to print the print job is different from that of the print server, there may be a case that the user cannot obtain a desired printed result in the print system of the multi-vendor printing environment. Thus, in such a case, the printer vendor that provides the print server cannot guarantee a printing quality of the print job of the other printer vendor.

Meanwhile, there are two conflicting requirements for the printer vendor that provides such a print server from users of the print system of the multi-vendor printing environment. One is that the printer vendor that provides such a print server is required to guarantee the printing quality of the print job of the other printer vendor. In such a case, it is better not to perform a process on the print job of the other printer vendor by the print system, in particular, when the specification of the print job of the other printer vendor is not known. The other is that the printer vendor that provides such a print server is required to configure the print server to perform a process on the print job of the other printer vendor while allowing a risk of causing an undesired printed result.

Thus, it is difficult for the printer vendor that provides such a print server to correspond to the two conflicting requirements in the print system of the multi-vendor printing environment.

Patent Document

[Patent Document 1] Japanese Unexamined Patent Application Publication No. 2015-26236

SUMMARY OF THE INVENTION

The present invention is made in light of the above problems, and provides a data processing apparatus capable of flexibly corresponding an application of a process targeting print data of a specific description format to print data of another description format.

According to an embodiment, there is provided a data processing apparatus including a processing unit configured to perform a process on print data or setting data of the print data by a processing method targeting print data of a specific description format; a receiving unit configured to receive print data and setting data of the print data of a description format selected by a user; a determination data obtaining unit configured to obtain determination data that indicates whether a printer driver used for inputting the received print data and the setting data of the print data is a target printer driver for the process performed by the processing unit, from the received print data and the setting data of the print data; and a process control unit configured to determine whether to perform the process by the processing unit on the received print data or the setting data of the print data based on the obtained determination data, and control the processing by the processing unit on the received print data or the setting data of the print data.

BRIEF DESCRIPTION OF THE DRAWINGS

Other objects, features and advantages of the present invention will become more apparent from the following detailed description when read in conjunction with the accompanying drawings.

FIG. 13 is a view illustrating an example of a structure of a table stored in a data storage unit;

FIG. 14 is a view illustrating another example of the structure of the table stored in the data storage unit;

FIG. 18 is a view illustrating an example of a structure of a setting stored in a setting storage unit;

DETAILED DESCRIPTION OF THE PREFERRED EMBODIMENTS

Figure 1:
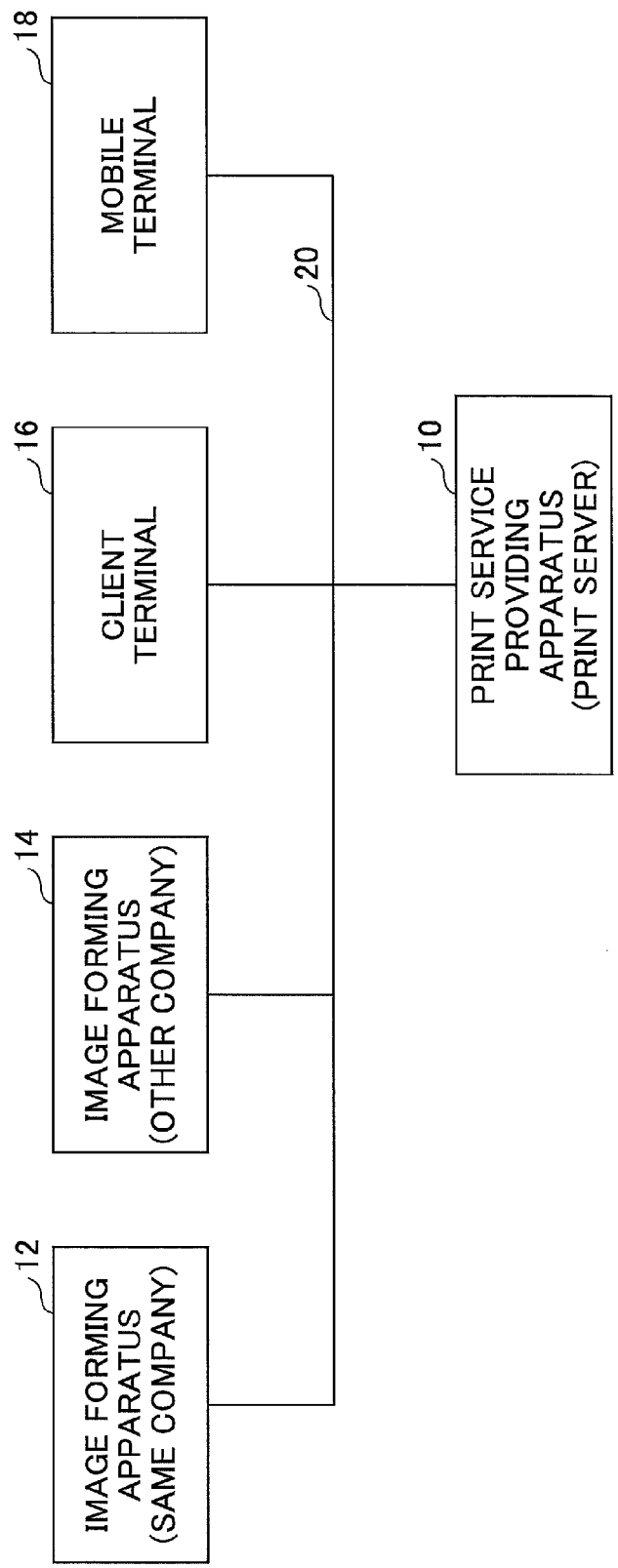
FIG. 1 is a view illustrating an example of a structure of a print system of an embodiment.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

First Embodiment (System Structure)

FIG. 1 is a view illustrating an example of a structure of a print system 1 of the embodiment. The print system 1 of FIG. 1 includes a print service providing apparatus (print server) 10, an image forming apparatus 12, an image forming apparatus 14, a client terminal 16, and a mobile terminal 18, that are connected via a network 20 such as LAN or INTERNET. The print system 1 of FIG. 1 may be actualized by on-premises or by using a so-called cloud.

The print service providing apparatus 10 is a print server that controls a job (print job). The print service providing apparatus 10 performs a necessary process on a job sent from the client terminal 16. In case of push-printing, after performing the necessary process on the job, the print service providing apparatus 10 sends print data to the image forming apparatus 12 or the image forming apparatus 14. In case of pull-printing, the print service providing apparatus 10 stores the job, and send print data in response to a request from the image forming apparatus 12 or the image forming apparatus 14.

Each of the image forming apparatuses 12 and 14 is a printer, a copying machine, a multifunction peripheral, a laser printer or the like that has a printing function. Each of the image forming apparatuses 12 and 14 includes a communication unit for having communication with the print service providing apparatus 10, and a print unit that outputs print data.

Here, it is assumed that the image forming apparatus 12 is a typical example of an image forming apparatus provided by a company (printer vendor) that is the same as the company that provides the print service providing apparatus 10. Meanwhile, it is assumed that the image forming apparatus 14 is a typical example of an image forming apparatus provided by a company that is different from the company that provides the print service providing apparatus 10. Thus, hereinafter, the image forming apparatus 12 is referred to as "the image forming apparatus 12 of the same company" and the image forming apparatus 14 is referred to as "the image forming apparatus 14 of the other company" as well.

The client terminal 16 is a terminal device used by a user, and is actualized by a smartphone, a mobile phone, a personal computer (PC) or the like, for example. The client terminal 16 is a client that inputs print data. As will be described later in detail, at least one of a supported printer driver ("52" in FIG. 6, for example) corresponding to the image forming apparatus 12 of the same company and a non-supported printer driver ("53" in FIG. 6, for example) corresponding to the image forming apparatus 14 of the other company is mounted on the client terminal 16.

Here, the way of dividing image forming apparatuses (printers) into the image forming apparatus 12 of the same company and the image forming apparatus 14 of the other company is just an example for describing a situation in which supported image forming apparatuses and non-supported image forming apparatuses exist. There are various ways for dividing the supported image forming apparatuses and the non-supported image forming apparatuses. For example, if the company that provides the print service providing apparatus 10 determines to support a specific printer driver corresponding to an image forming apparatuses of another company, the printer driver is treated as the supported printer driver. Further, even for the image forming apparatus provided by the same company, if the image forming apparatus is of an old model and cannot correspond to a printer driver supported by the print service providing apparatus 10, for example, such an image forming apparatus is treated as the non-supported image forming apparatus.

Furthermore, there may be a case that a Software Development Kit (SDK) or the like cannot be mounted on the image forming apparatus 14 of the other company. In such a case, the mobile terminal 18 is used as an operation terminal for printing a job sent from the print service providing apparatus 10 by such an image forming apparatus 14 of the other company. The mobile terminal 18 may be actualized by a smartphone, a mobile phone, a PC or the like.

The print system 1 of FIG. 1 is just an example, and the print system 1 may have a different structure.

(Hardware Structure)

Figure 2:
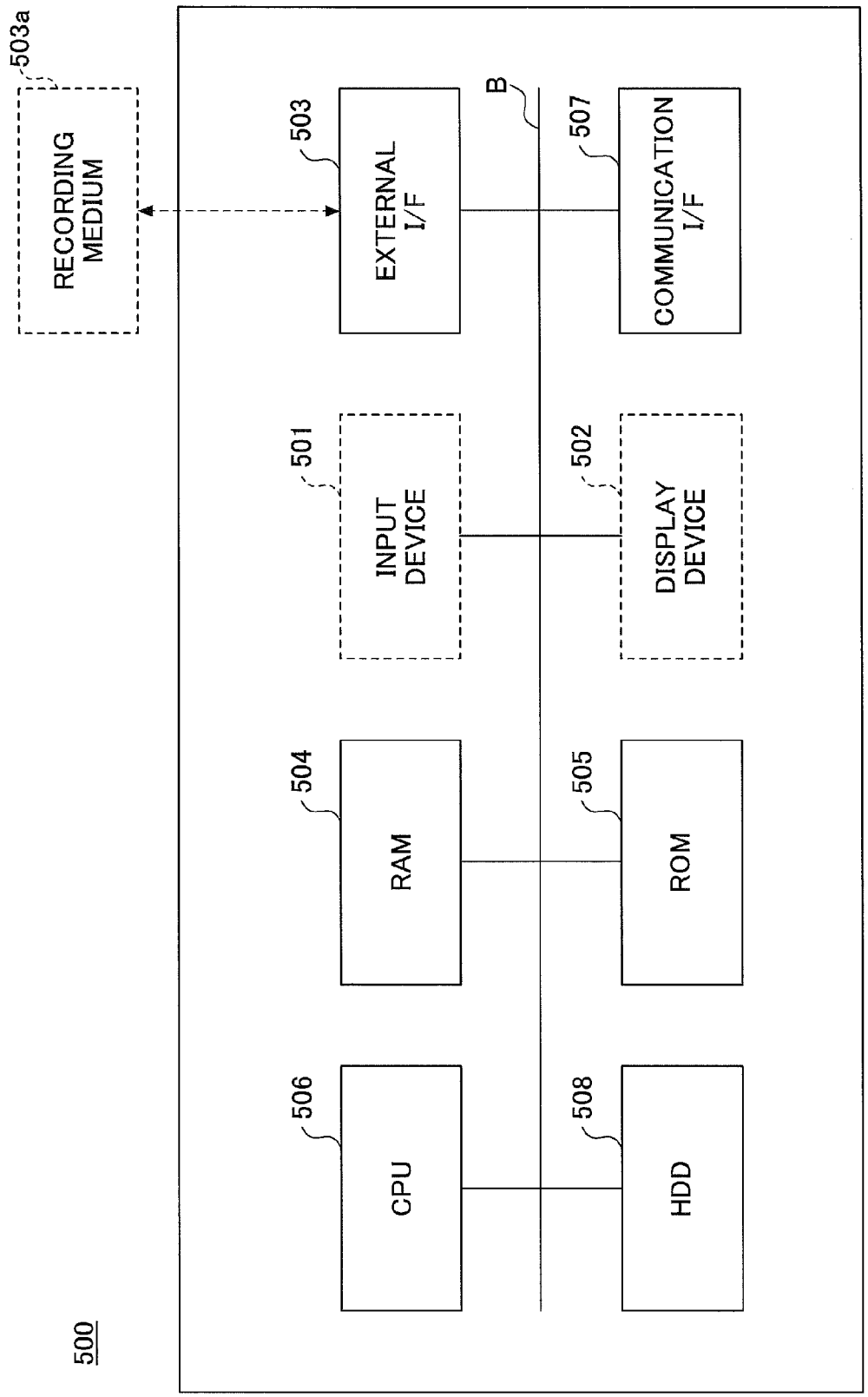
FIG. 2 is a view illustrating an example of a hardware structure of a computer of the embodiment.

Each of the print service providing apparatus 10, the client terminal 16, and the mobile terminal 18 of FIG. 1 is actualized by a computer having a hardware structure as illustrated in FIG. 2, for example. FIG. 2 is a view illustrating an example of a hardware structure of a computer 500 of the embodiment.

The computer 500 illustrated in FIG. 2 includes an input device 501, a display device 502, an external I/F 503, a RAM 504, a ROM 505, a CPU 506, a communication I/F 507, a HDD 508 and the like, which are connected with each other by a bus B. The input device 501 and the display device 502 may be connected only when it is necessary.

The input device 501 includes a keyboard, a mouse, a touch panel or the like, and is used by a user to input various operation signals. The display device 502 includes a display or the like, and displays a processed result by the computer 500.

The communication I/F 507 is an interface that connects the computer 500 to the network 20. With this configuration, the computer 500 can perform data communication via the communication I/F 507.

The HDD 508 is an example of a non-volatile storage device that stores programs or data. The programs or data stored in the HDD 508 include an OS that is basic software for controlling the entirety of the computer 500, application software (hereinafter, simply referred to as "application" as well) that provides various functions on the OS or the like. The computer 500 may include a drive device that uses a flash memory as a recording medium (a Solid State Drive (SSD), for example) instead of the HDD 508.

The external I/F 503 is an interface for an external device. As the external device, a recording medium 503a or the like may be used. With this configuration, the computer 500 can read and/or write data from and on the recording medium 503a via the external I/F 503. As the recording medium 503a, a flexible disk, a Compact Disk (CD), a Digital Versatile Disk (DVD), an SD Memory card, a Universal Serial Bus memory (USB memory) or the like may be used.

The ROM 505 is an example of a non-volatile semiconductor memory (storage device) that can store programs and data even when the power switch is turned off. The ROM 505 stores programs and data such as a Basic Input/Output System (BIOS) that is executed when activating the computer 500, an OS setting, or a network setting. The RAM 504 is an example of a volatile semiconductor memory (storage device) that temporarily stores programs and data.

The CPU 506 is an arithmetic unit that actualizes control and functions of the entirety of the computer 500 by reading out programs or data from the storage device such as the ROM 505 or the HDD 508 on the RAM 504, and executing the processes. The print service providing apparatus 10, the client terminal 16, and the mobile terminal 18 of the embodiment are capable of actualizing various processes, which will be described later, by the above described hardware structure of the computer 500.

Figure 3:
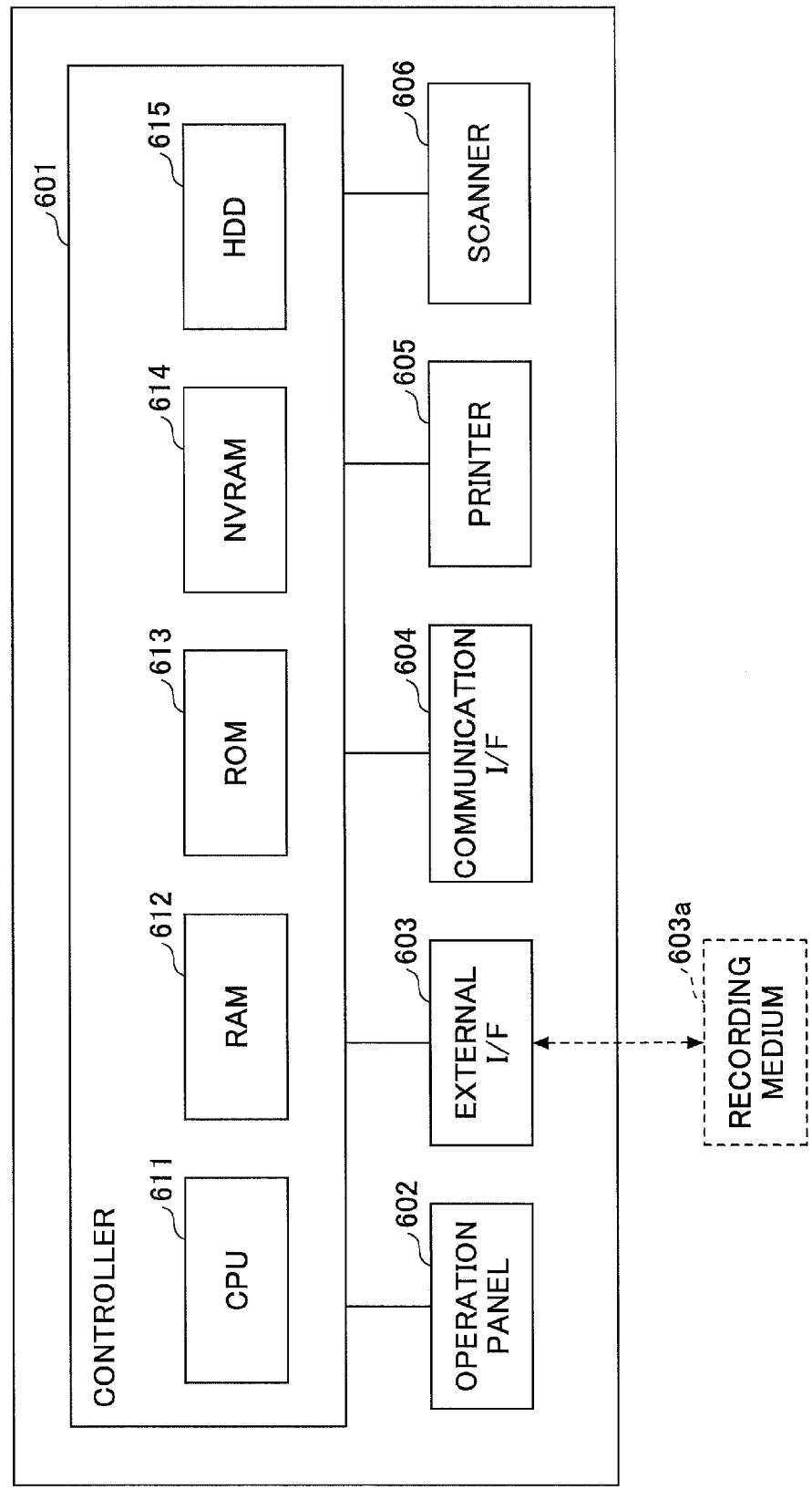
FIG. 3 is a view illustrating an example of a hardware structure of an MFP of the embodiment.

The MFP 600, which is an example of the image forming apparatus 12 or 14 of FIG. 1, is actualized by a computer having a hardware structure as illustrated in FIG. 3, for example. FIG. 3 is a view illustrating an example of a hardware structure of the MFP 600 of the embodiment.

The MFP 600 of FIG. 3 includes a controller 601, an operation panel 602, an external I/F 603, a communication I/F 604, a printer 605, a scanner 606 and the like. The controller 601 includes a CPU 611, a RAM 612, a ROM 613, an NVRAM 614, a HDD 615 and the like. The ROM 613 stores various programs and data. The RAM 612 temporarily stores various programs and data. The NVRAM 614 stores setting data or the like, for example. The HDD 615 stores various programs and data.

The CPU 611 is an arithmetic unit that actualizes control and functions of the entirety of the MFP 600 by reading out programs, data, setting data or the like from the storage device such as the ROM 613, the NVRAM 614, or the HDD 615 on the RAM 612, and executing the processes.

The operation panel 602 includes an input unit that receives an input from a user and a display unit that displays data. The external I/F 603 is an interface for an external device. As the external device, a recording medium 603a or the like may be used. With this configuration, the MFP 600 can read and/or write data from and on the recording medium 603a via the external I/F 603. As the recording medium 603a, an IC card, a flexible disk, a CD, a DVD, an SD Memory card, a USB memory or the like may be used.

The communication I/F 604 is an interface for connecting the MFP 600 to the network 20. With this, the MFP 600 can perform data communication via the communication I/F 604. The printer 605 is a printing device for printing print data on a transferred object. The transferred object may be a paper, a coated paper, a cardboard, an OHP, a plastic film, a prepreg, a copper film or the like, and not limited to a paper. Further, the scanner 606 is a reading device for reading image data (electronic data) from a document and generating an image file (an electronic file).

The image forming apparatuses 12 and 14 of FIG. 1 can actualize various processes, which will be described later, by having the above described hardware structure.

(Software Structure)
(Print Service Providing Apparatus)

Figure 4:
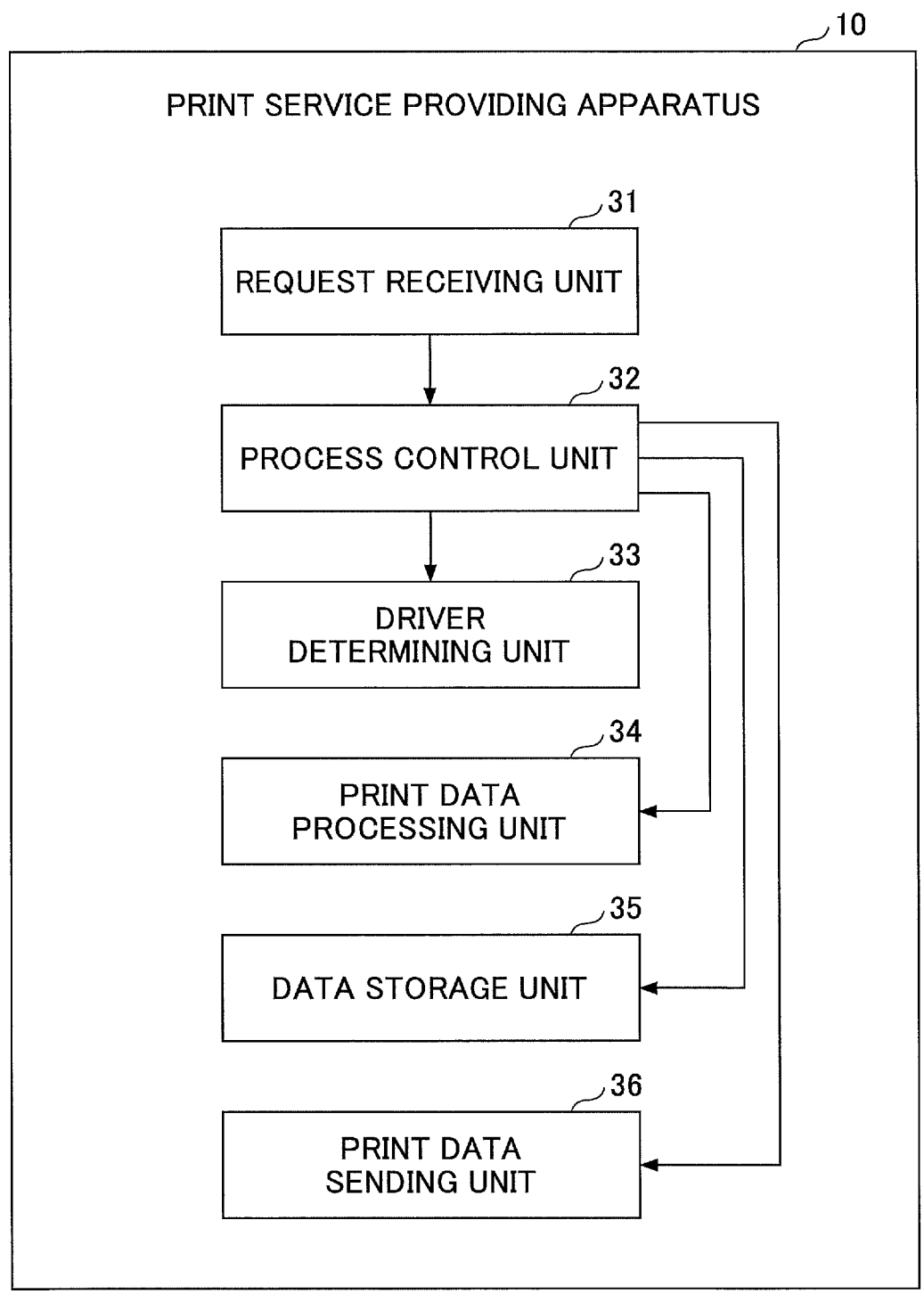
FIG. 4 is a process block diagram illustrating an example of a print service providing apparatus of the embodiment.

The print service providing apparatus 10 of the embodiment is actualized by a process block illustrated in FIG. 4, for example. FIG. 4 is a process block diagram illustrating an example of the print service providing apparatus 10 of the embodiment.

The print service providing apparatus 10 illustrated in FIG. 4 actualizes a request receiving unit 31, a process control unit 32, a driver determining unit 33, a print data processing unit 34, a data storage unit 35, and a print data sending unit 36 by executing a program.

The request receiving unit 31 receives a request from the client terminal 16, the image forming apparatus 12, the image forming apparatus 14, or the mobile terminal 18, and returns a processed result. The request receiving unit 31 may be actualized by WebAPI or WebUI, or may be actualized by a mail receiving function including a mail server or the like. Specifically, the request receiving unit 31 receives print data and setting data of the print data of a description format selected by a user.

The print data processing unit 34 performs a process such as processing on the print data, or changing the image forming apparatus that prints the print data. The process performed by the print data processing unit 34 is a process of a rule-based printing, for example. Here, the print data processing unit 34 is configured to perform the process on the print data or setting data of the print data by a processing method targeting print data of a specific description format. In other words, the process performed by the print data processing unit 34 is mounted (designed) for print data that is generated by the supported printer driver 52.

Conventionally, there are a plurality of print languages such as Post Script (PS) or Printer Control Language (PCL) for print data. Each company can design and develop own specification for such print languages. Thus, for the image forming apparatus 12 of the company that provides the print service providing apparatus 10, as a description format can be grasped for the print data described by a print language designed and developed by that company, printing through the print service providing apparatus 10 can be supported. Further, for print data described by another print language, if its basic specification is standardized, it is possible to support the print data. However, if such print data includes unique specification that cannot be commonly handled, a positional shift, an unnatural margin or the like may occur for some print languages, and it is difficult to completely support a print operation.

For example, the print data may be configured by a Printer Job Language (PJL) and a Page Description Language (PDL). Here, a file name or a value of a print condition such as the number of printing, a setting of one-side/both-sides may be described in the PJL, and a parameter that is uniquely defined may also be included in the PJL. Thus, if a parameter that influences a result of a print process is set as a unique parameter, generally, only a person who knows the definition of the unique parameter can handle such a value of the unique parameter. As the print data processing unit 34 is configured to perform an appropriate process on print data described by a specific print language corresponding to the supported printer driver 52 (see FIG. 6) in accordance with its specification, the print data processing unit 34 can guarantee an operation of the print data generated by the supported printer driver 52. On the other hand, for print data generated by the non-supported printer driver 53 (see FIG. 6) that generates the print data by a print language different from the specific print language, the print data processing unit 34 does not guarantee its operation.

The process control unit 32 controls a process on the print data based on a determination by the driver determining unit 33 or the like, for example. The driver determining unit 33 determines whether to perform a process by the print data processing unit 34. The driver determining unit 33 determines whether a printer driver used for inputting the print data and bibliographic data (setting data) of the print data is a target printer driver for the process performed by the print data processing unit 34. Specifically, as an example, the driver determining unit 33 determines whether to perform the process by the print data processing unit 34 based on data for specifying or determining whether the supported printer driver 52 is designated and used by the user or the non-supported printer driver 53 is designated and used by the user in the client terminal 16, as determination data for the determination. For this example, the driver determining unit 33 determines that the used printer driver is the target printer driver for the process performed by the print data processing unit 34 when the supported printer driver 52 is designated and used. On the other hand, the driver determining unit 33 determines that the used printer driver is not the target printer driver when the non-supported printer driver 53 is designated and used.

The data storage unit 35 stores input print data and bibliographic data. The data storage unit 35 may be actualized by a file system, a Network File System (NFS), a Relational Database Management System (RDBMS) or the like, for example. The print data and the bibliographic data may be stored separately. For example, the data storage unit 35 may store the bibliographic data in the RDBMS, and store the print data in the file system.

The print data sending unit 36 sends the input job to the image forming apparatus 12 or the image forming apparatus 14. The print data sending unit 36 may use a printer driver (port monitor), or may use another method.

The print service providing apparatus 10 may install the supported printer driver 52 and the non-supported printer driver 53, which will be described later, and is capable of causing the client terminal 16 to use the supported printer driver 52 or the non-supported printer driver 53 by a printer sharing mechanism of an OS.

(Image Forming Apparatus)

Figure 5:
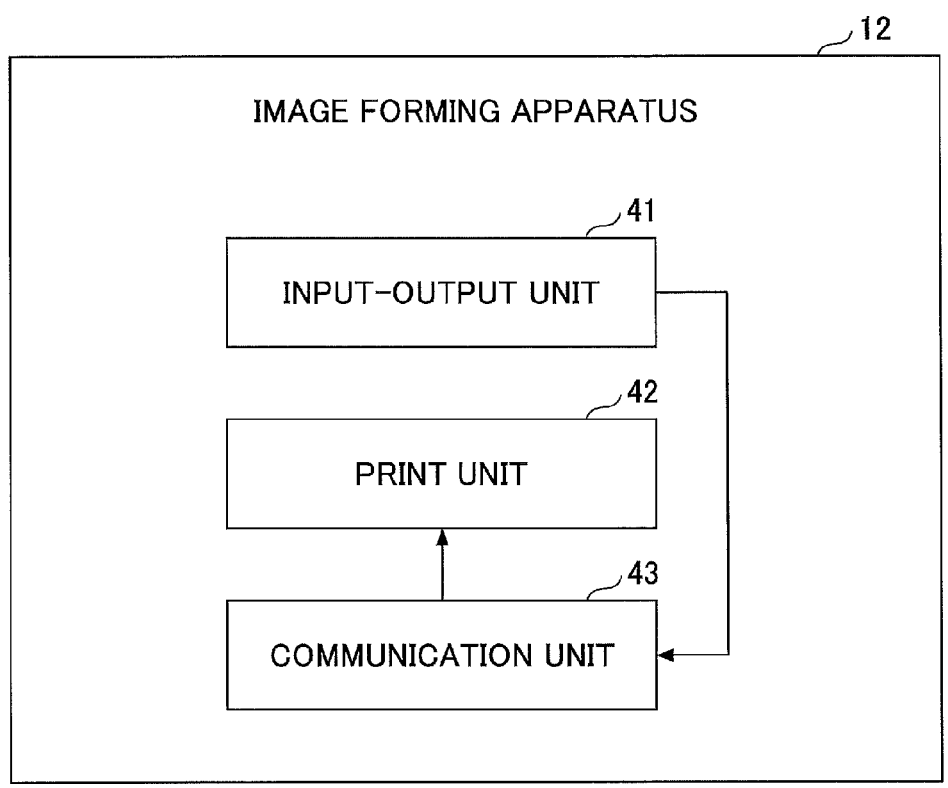
FIG. 5 is a process block diagram illustrating an example of an image forming apparatus of the embodiment.

As the image forming apparatus 12 and the image forming apparatus 14 have the same process block, a process block of the image forming apparatus 12 is described as an example. The image forming apparatus 12 of the embodiment is actualized by a process block as illustrated in FIG. 5, for example. FIG. 5 is a process block diagram illustrating an example of the image forming apparatus 12 of the embodiment.

The image forming apparatus 12 illustrated in FIG. 5 actualizes an input-output unit 41, a print unit 42, and a communication unit 43 by executing a program. The input-output unit 41 accepts a request from a user, and displays information to the user. The input-output unit 41 is actualized by an operation panel 602, for example. The print unit 42 prints print data. The communication unit 43 communicates with the print service providing apparatus 10 or the like.

(Client Terminal)

Figure 6:
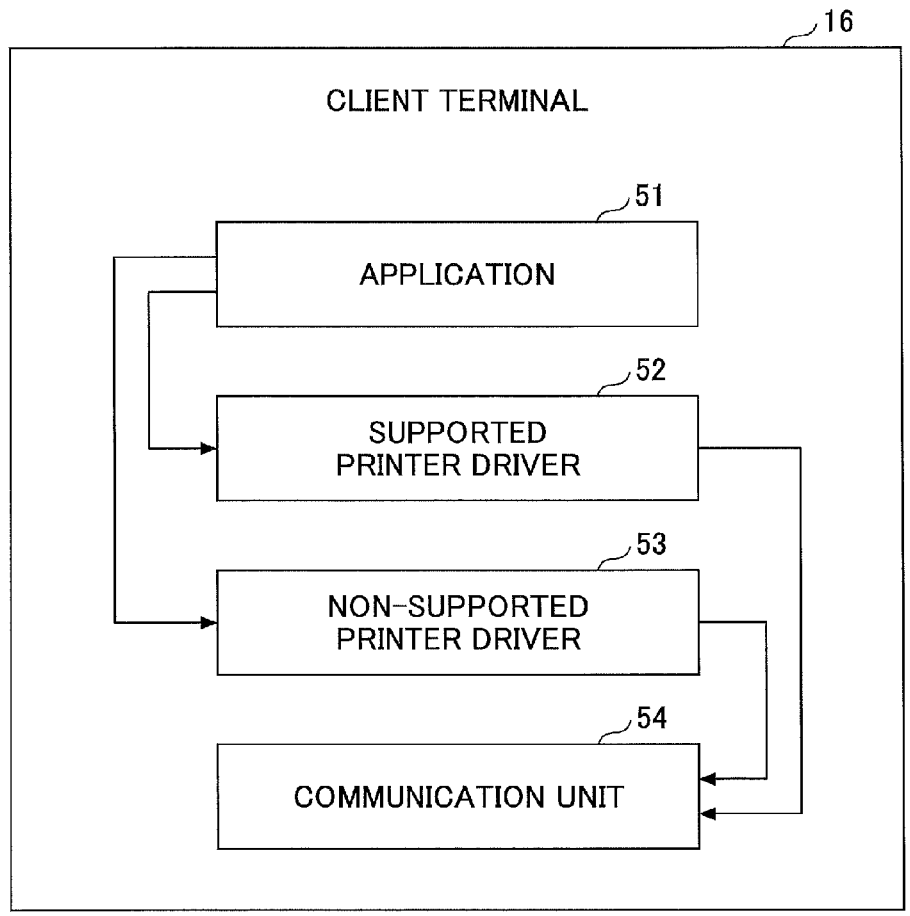
FIG. 6 is a process block diagram illustrating an example of a client terminal of the embodiment.

The client terminal 16 of the embodiment is actualized by a process block as illustrated in FIG. 6, for example. FIG. 6 is a process block diagram illustrating an example of the client terminal 16 of the embodiment. The client terminal 16 of FIG. 6 actualizes a supported printer driver 52, a non-supported printer driver 53, a communication unit 54, and application 51 by executing a program.

The application 51 is a program such as word processing application that accepts a print request from a user.

The supported printer driver 52 is a printer driver for which the operation of the process by the print data processing unit 34 of the print service providing apparatus 10 is guaranteed. Here, the supported printer driver 52 is a printer driver corresponding to the image forming apparatus 12, and is used when printing from the image forming apparatus 12 of the same company. The supported printer driver 52 converts application data of the application 51 to print data of a description format capable of being printed by the image forming apparatus 12. As specification or the like of the print data converted by the supported printer driver 52 is grasped by the company that provides the print service providing apparatus 10, it is possible for the print service providing apparatus 10 to perform an appropriate process in accordance with the specification. Thus, even when the process such as editing is performed by the print data processing unit 34 of the print service providing apparatus 10, the printing quality can be guaranteed.

The non-supported printer driver 53 is a printer driver for which the operation of the process by the print data processing unit 34 of the print service providing apparatus 10 cannot be guaranteed. The non-supported printer driver 53 is a printer driver corresponding to the image forming apparatus 14 of the other company, and is used when printing from the image forming apparatus 14 of the other company. The non-supported printer driver 53 converts application data of the application 51 to print data of a description format capable of being printed by the image forming apparatus 14.

Here, as there is a case that specification or the like of the print data converted by the non-supported printer driver 53 is not grasped by the company that provides the print service providing apparatus 10, if the process such as editing is performed on such print data by the print data processing unit 34 of the print service providing apparatus 10, the print data may not be properly printed. Thus, the printing quality cannot be guaranteed.

The application 51 accepts a print request in which the supported printer driver 52 or the non-supported printer driver 53 is designated. Here, it is unnecessary for the user to recognize whether the designating printer driver is the supported one or the non-supported one. It is assumed that printer drivers (output devices) capable of being selected by the user may contain the supported printer driver 52 and the non-supported printer driver 53. For example, when considering the system of the embodiment as a base, when the user wants to print from the image forming apparatus 12 of the same company, the user designates the supported printer driver 52 and requests printing. On the other hand, if the user wants to print from the image forming apparatus 14 of the other company, the user designates the non-supported printer driver 53 and requests printing.

The communication unit 54 communicates with the print service providing apparatus 10. The communication unit 54 is actualized by a standard function of the OS (sharing a printer or the like). Here, the communication unit 54 may be actualized by specific application or the like, or may be actualized by a browser or a mailer.

(Mobile Terminal)

Figure 7:
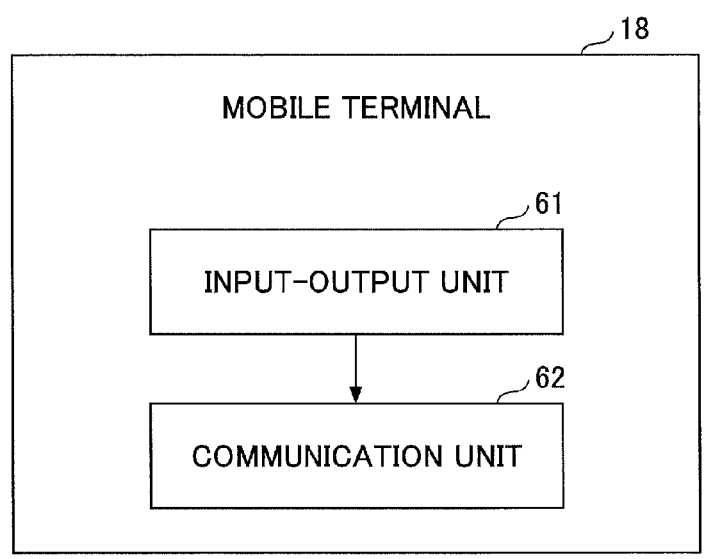
FIG. 7 is a process block diagram illustrating an example of a mobile terminal of the embodiment.

The mobile terminal 18 of the embodiment is actualized by a process block as illustrated in FIG. 7, for example. FIG. 7 is a process block diagram illustrating an example of the mobile terminal 18 of the embodiment. The mobile terminal 18 of FIG. 7 actualizes an input-output unit 61 and a communication unit 62 by executing a program.

The input-output unit 61 accepts a request from a user, and provides data to the user. The input-output unit 61 is actualized by a touch panel or the like, for example. The communication unit 62 communicates with the print service providing apparatus 10.

(Detail of Processes)

Processes of the print system 1 of the embodiment are described in detail in the following.

(Inputting Job in Pull-Printing)

Figure 8:
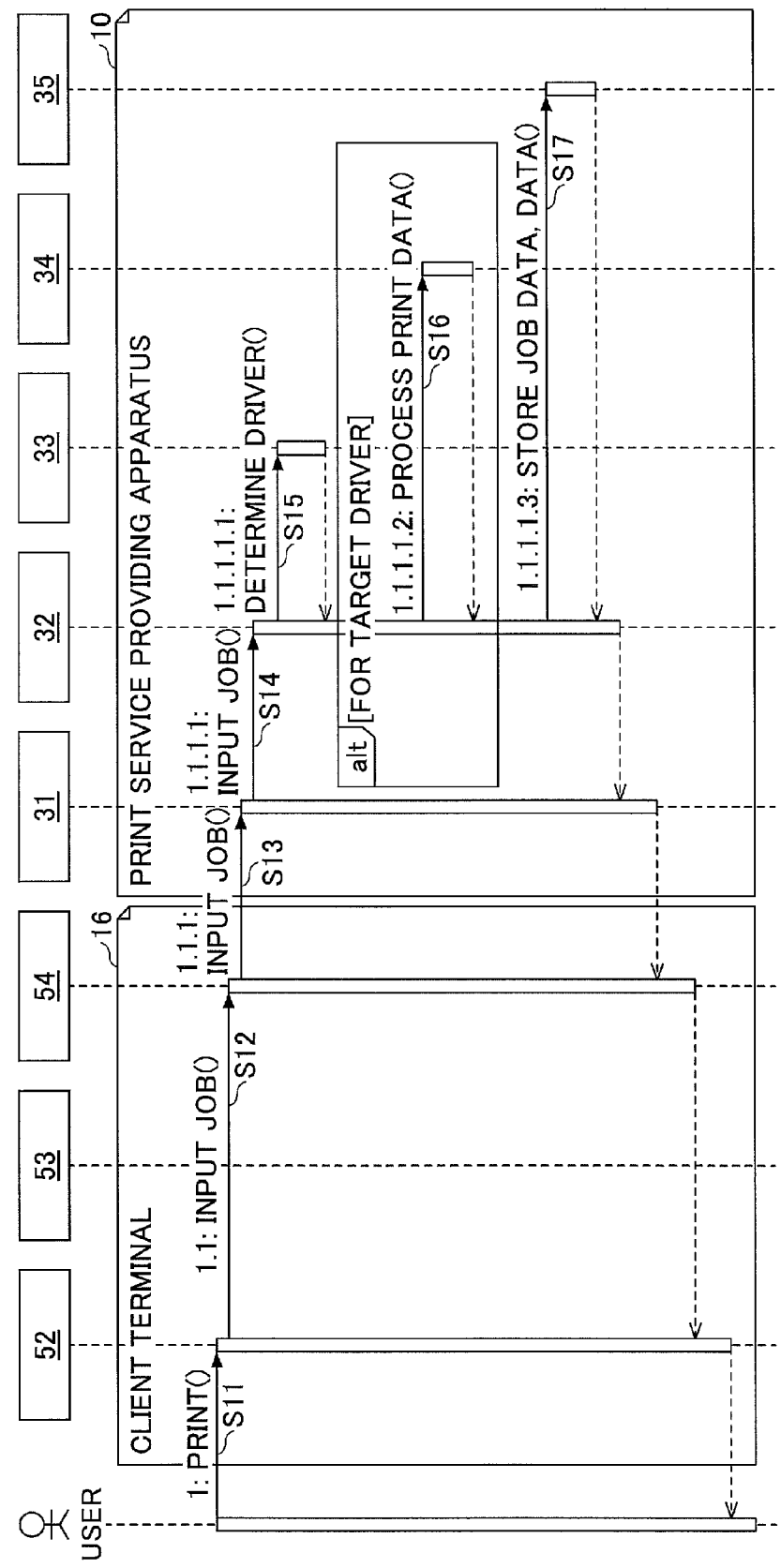
FIG. 8 is a sequence diagram illustrating an example of inputting a job in pull-printing.
Figure 9:
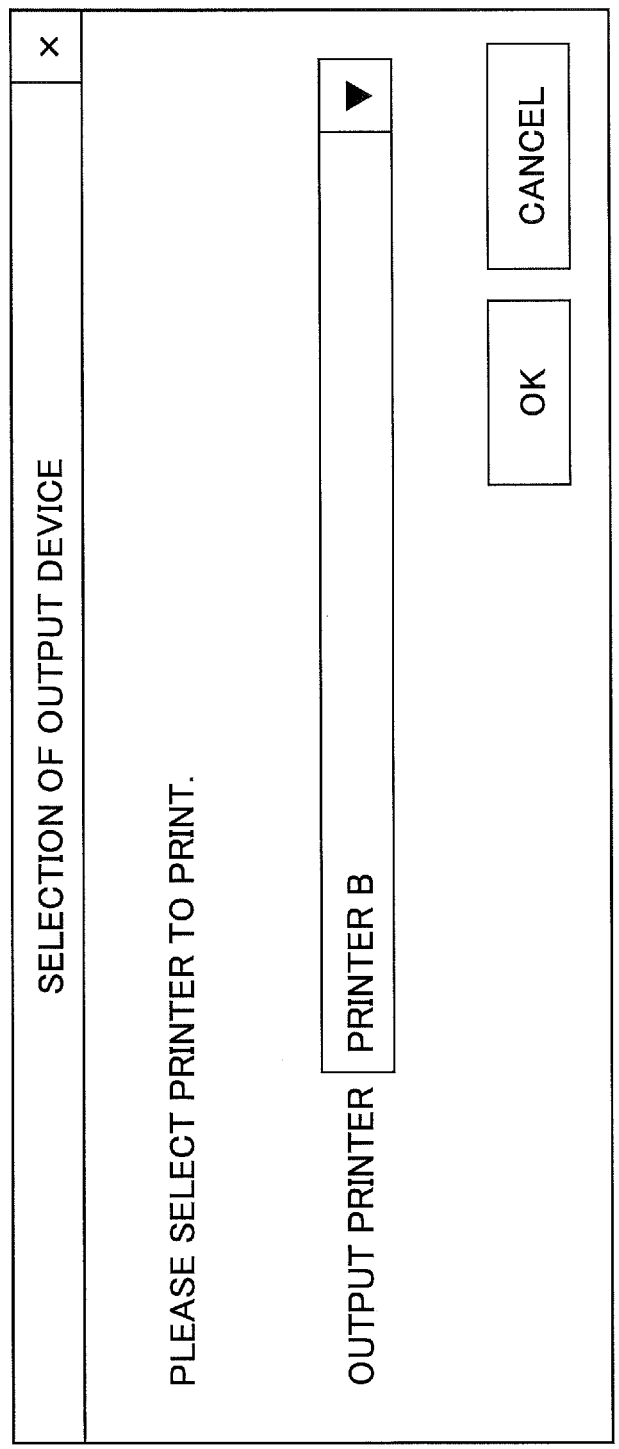
FIG. 9 is an image view illustrating an example of an output device selection screen.

Processes of inputting a job in the print service providing apparatus 10 from the client terminal 16 in pull-printing are performed by steps as illustrated in FIG. 8, for example. FIG. 8 is a sequence diagram illustrating an example of inputting a job in pull-printing. FIG. 9 is an image view illustrating an example of an output device selection screen.

For example, a user operates the application 51 of the client terminal 16, and selects the image forming apparatus 12 or the image forming apparatus 14, by which the user hopes to have the job printed, from the output device selection screen as illustrated in FIG. 9 to request printing.

The application 51 requests printing to either of the supported printer driver 52 or the non-supported printer driver 53 corresponding to the selected image forming apparatus 12 or the image forming apparatus 14. For example, when the image forming apparatus 12 of the same company is selected from the output device selection screen, the application 51 requests printing in which the supported printer driver 52 corresponding to the image forming apparatus 12 is designated. On the other hand, when the image forming apparatus 14 of the other company is selected from the output device selection screen, the application 51 requests printing in which the non-supported printer driver 53 corresponding to the image forming apparatus 14 is designated. FIG. 8 illustrates a sequence diagram in which the image forming apparatus 12 is selected from the output device selection screen.

In step S11, when the application 51 requests printing, the supported printer driver 52 converts the application data to print data. Proceeding to step S12, the supported printer driver 52 requests the communication unit 54 to send a job of the converted print data to the print service providing apparatus 10. Proceeding to step S13, the communication unit 54 sends the job to the print service providing apparatus 10.

Proceeding to step S14, the request receiving unit 31 of the print service providing apparatus 10 inputs the received job in the process control unit 32. Here, the job contains print data and data regarding printing of the print data (hereinafter, simply referred to as "bibliographic data" as well).

Proceeding to step S15, the process control unit 32 requests the driver determining unit 33 to determine whether the designated printer driver is the target printer driver for the process performed by the print data processing unit 34. Specifically, the process control unit 32 requests the driver determining unit 33 to determine whether the supported printer driver 52 is designated or the non-supported printer driver 53 is designated in the print request by the client terminal 16. Here, a result of the determination by the driver determining unit 33 is an example of determination data that is used for determining whether to perform a process by the print data processing unit 34.

The driver determining unit 33 determines a driver based on the print data and the bibliographic data included in the job. Then, the driver determining unit 33 sends a determined result of the driver to the process control unit 32 as the determination data.

The process control unit 32 determines whether to perform the process by the print data processing unit 34 based on the determination data sent from the driver determining unit 33. For example, when the determination data indicates using of the supported printer driver 52, the process control unit 32 determines to perform the process by the print data processing unit 34. Meanwhile, when the determination data indicates using of the non-supported printer driver 53, the process control unit 32 determines not to perform the process by the print data processing unit 34. Variations of the determination data that is used for determining whether to perform the process by the print data processing unit 34 are described later.

When it is determined to perform the process by the print data processing unit 34, proceeding to step S16, the process control unit 32 requests the print data processing unit 34 to perform the process. Upon receiving the request to perform the process, the print data processing unit 34 performs the process on the print data. The process performed by the print data processing unit 34 on the print data includes processing the print data itself, changing user data, a process in accordance with a rule (a rule-based process) and the like. Thus, the process performed by the print data processing unit 34 on the print data includes switching between push-printing and pull-printing, embedding authentication data, changing a print setting, changing the image forming apparatus to output and the like. Here, when it is determined not perform the process by the print data processing unit 34, the process control unit 32 skips the process of step S16.

In step S17, the process control unit 32 requests the data storage unit 35 to store the print data and the bibliographic data. Further, the process control unit 32 may request the data storage unit 35 to store the determination data sent from the driver determining unit 33 in step S15.

The process of step S16 illustrated in the sequence diagram of FIG. 8 may be performed when the image forming apparatus 12 requests to obtain the job. However, as there is a possibility that the job is switched to push-printing by the process by the print data processing unit 34, this process is performed when the job is input.

(Inputting Job in Push (Direct) Printing)

Figure 10:
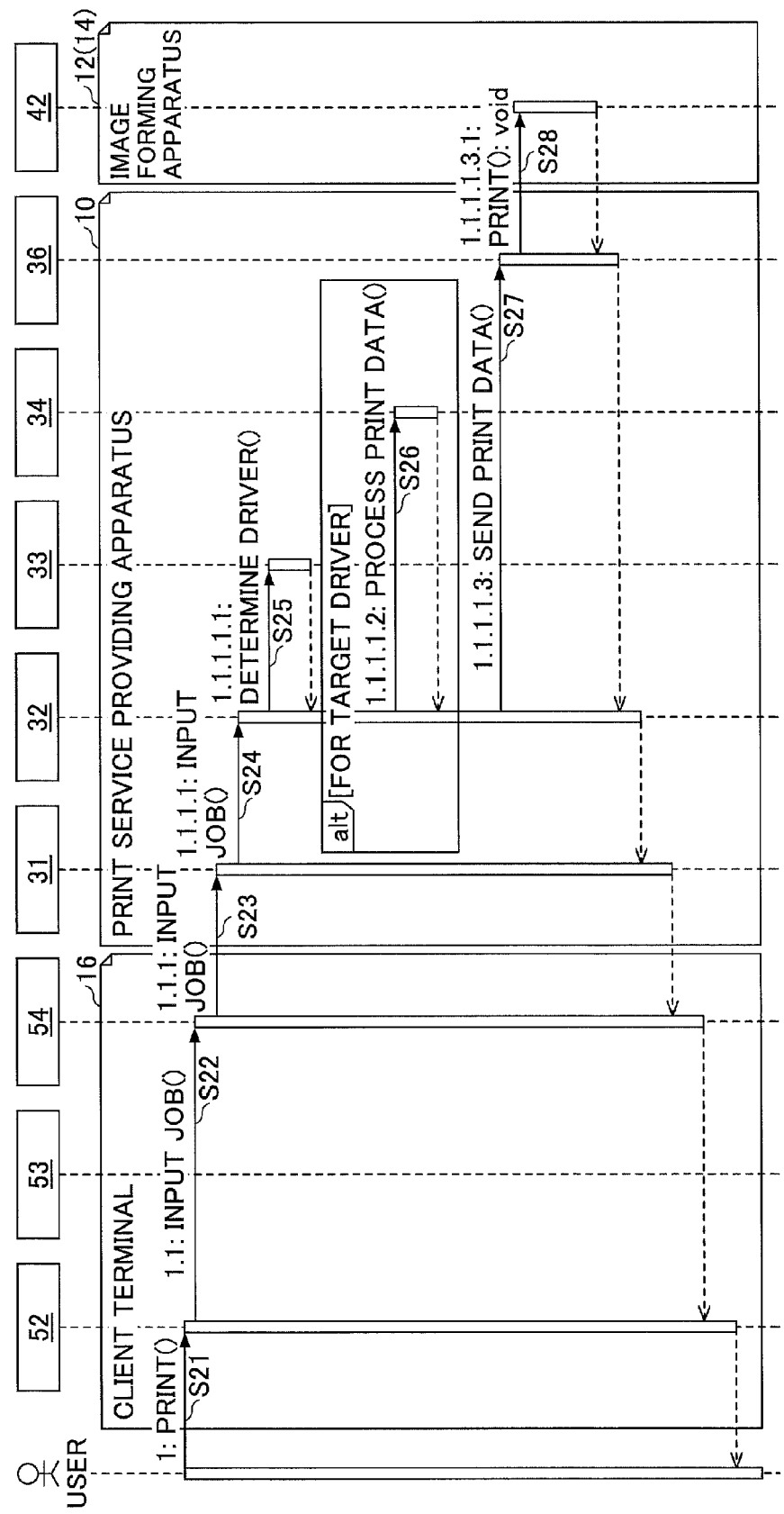
FIG. 10 is a sequence diagram illustrating an example of inputting a job in push-printing.

Processes of inputting a job in the print service providing apparatus 10 from the client terminal 16 in push-printing are performed by steps as illustrated in FIG. 10, for example. FIG. 10 is a sequence diagram illustrating an example of inputting a job in push-printing. Processes of step S21 to S26 are the same as the processes of step S11 to S16 in FIG. 8, and the description is not repeated.

In step S27, the process control unit 32 requests the print data sending unit 36 to send the print data and the bibliographic data to the image forming apparatus 12 (or the image forming apparatus 14).

Proceeding to step S28, the print data sending unit 36 sends the print data and the bibliographic data to the image forming apparatus 12 (or the image forming apparatus 14). The image forming apparatus 12 (or the image forming apparatus 14) performs printing based on the received print data and the bibliographic data.

(Pull-Printing)

Figure 11:
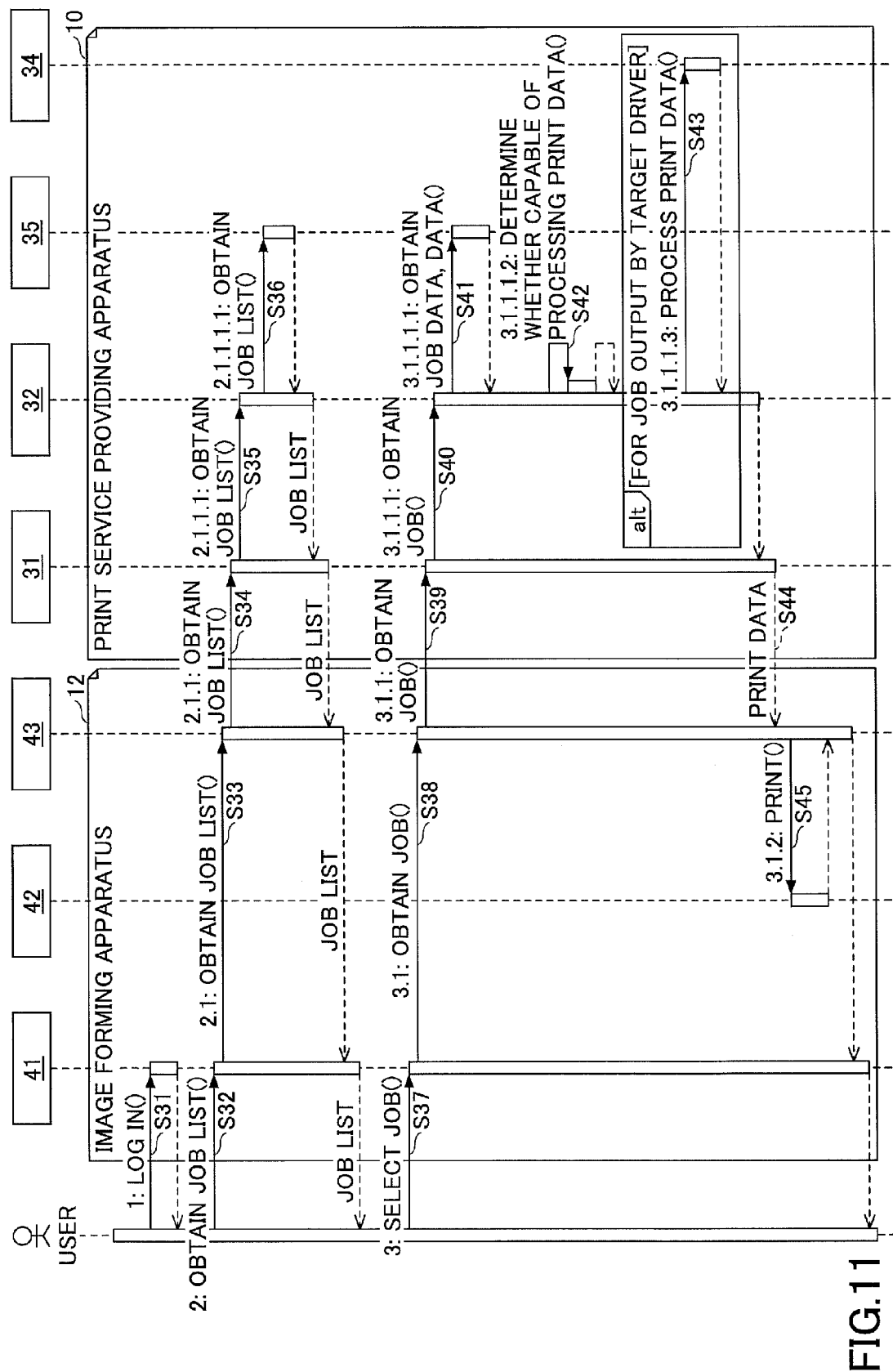
FIG. 11 is a sequence diagram illustrating an example of pull-printing in the image forming apparatus of the same company.

Processes of printing the job obtained from the print service providing apparatus 10 by the image forming apparatus 12 of the same company in pull-printing are performed by steps as illustrated in FIG. 11, for example. FIG. 11 is a sequence diagram illustrating an example of pull-printing in the image forming apparatus 12 of the same company.

In step S31, a user operates the input-output unit 41 of the image forming apparatus 12 and logs in the image forming apparatus 12. The process of log-in in step S31 may be performed in cooperation with an authentication service such as LDAP, or may be simply performed by using a personal identification number or the like.

Proceeding to step S32, the user operates the input-output unit 41 of the image forming apparatus 12 and requests to obtain a job list. Proceeding to step S33, the input-output unit 41 requests the communication unit 43 to obtain a job list. Proceeding to step S34, the communication unit 43 requests the print service providing apparatus 10 to send the job list.

In step S35, the request receiving unit 31 of the print service providing apparatus 10 requests the process control unit 32 to obtain the job list. Proceeding to step S36, the process control unit 32 obtains the job list from the data storage unit 35. The job list obtained in step S36 is sent to the image forming apparatus 12. The input-output unit 41 of the image forming apparatus 12 displays the sent job list.

Proceeding to step S37, the user selects a desired job from the job list displayed on the input-output unit 41 of the image forming apparatus 12, and requests printing. The input-output unit 41 requests the communication unit 43 to obtain the job based on the request of printing from the user. Proceeding to step S39, the communication unit 43 requests the print service providing apparatus 10 to send the job.

In step S40, the request receiving unit 31 of the print service providing apparatus 10 requests the process control unit 32 to obtain the job. Proceeding to step S41, the process control unit 32 obtains the print data and the bibliographic data from the data storage unit 35. Further, the process control unit 32 obtains the determination data that indicates a determined result of the driver from the data storage unit 35 as well.

Then, in step S42, the process control unit 32 determines whether to perform the process by the print data processing unit 34 based on the obtained determination data (determination of whether to perform the process). This process is similar to the process of step S15. When it is determined to perform the process by the print data processing unit 34, proceeding to step S43, the process control unit 32 requests the print data processing unit 34 to perform the process. The print data processing unit 34 performs the process on the print data as described above with reference to step S16. When it is determined not to perform the process by the print data processing unit 34, the process control unit 32 skips the process of step S43.

In step S44, the print service providing apparatus 10 sends the print data and the bibliographic data to the image forming apparatus 12. In step S45, the image forming apparatus 12 performs printing based on the received print data and the bibliographic data.

Here, as illustrated in step S42, whether to perform the process by the print data processing unit 34 is determined again after the image forming apparatus 12 requests to send the job in the sequence diagram of FIG. 11. However, whether to perform the process by the print data processing unit 34 may be determined once at either of when the job is input (see step S15 in FIG. 8) or when performing the pull-printing (step S42). Thus, the processes of steps S42 and S43 of the sequence diagram of FIG. 11 may be omitted. Alternatively, the processes of steps S15 and S16 of the sequence diagram of FIG. 8 may be omitted.

The processes of the sequence diagram of FIG. 11 are for the image forming apparatus 12 of the same company from which the user can request the print service providing apparatus 10 to obtain a job list or a job. However, processes for the image forming apparatus 14 of the other company from which a user cannot request the print service providing apparatus 10 to obtain a job list or a job are as illustrated in FIG. 12, for example.

Figure 12:
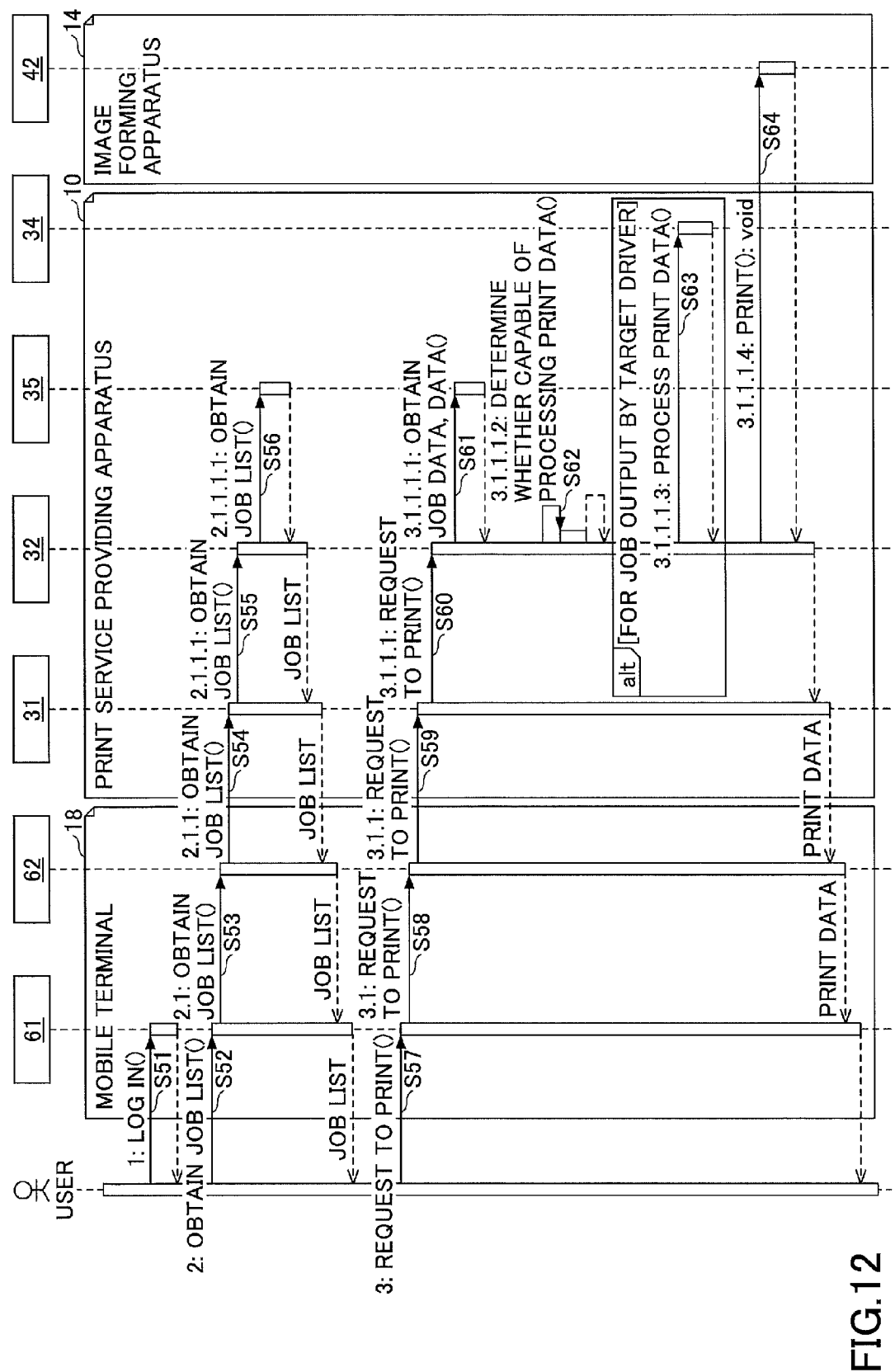
FIG. 12 is a sequence diagram illustrating an example of pull-printing in the image forming apparatus of the other company.

FIG. 12 is a sequence diagram illustrating an example of pull-printing in the image forming apparatus 14 of the other company. Processes of printing the job obtained from the print service providing apparatus 10 by the image forming apparatus 14 of the other company in pull-printing are performed by steps as illustrated in FIG. 12, for example. In this example, a user uses the mobile terminal 18 to request obtaining a job list or printing.

In step S51, a user operates the input-output unit 61 of the mobile terminal 18 and logs in the mobile terminal 18. The process of log-in in step S51 may be performed in cooperation with an authentication service such as LDAP, or may be simply performed by using a personal identification number or the like.

Proceeding to step S52, the user operates the input-output unit 61 of the mobile terminal 18 to request obtaining a job list. Proceeding to step S53, the input-output unit 61 requests the communication unit 62 to obtain the job list. Proceeding to step S54, the communication unit 62 request the print service providing apparatus 10 to obtain the job list.

In step S55, the request receiving unit 31 of the print service providing apparatus 10 requests the process control unit 32 to obtain the job list. Proceeding to step S56, the process control unit 32 obtains the job list from the data storage unit 35. The job list obtained in step S56 is sent to the mobile terminal 18. The input-output unit 61 of the mobile terminal 18 displays the sent job list.

Proceeding to step S57, the user selects a desired job from the job list displayed on the input-output unit 61 of the mobile terminal 18, and instructs to print. Proceeding to step S58, the input-output unit 61 requests the communication unit 62 to send a print instruction to the print service providing apparatus 10. Proceeding to step S59, the communication unit 62 sends the print instruction to the print service providing apparatus 10.

In step S60, the request receiving unit 31 of the print service providing apparatus 10 instructs the process control unit 32 to print. Proceeding to step S61, the process control unit 32 obtains the print data and the bibliographic data from the data storage unit 35. Further, the process control unit 32 obtains the determination data that indicates a determined result of the driver from the data storage unit 35 as well.

Then, in step S62, the process control unit 32 determines whether to perform a process by the print data processing unit 34 based on the obtained determination data (determination of whether to perform the process). When it is determined to perform the process by the print data processing unit 34, proceeding to step S63, the process control unit 32 requests the print data processing unit 34 to perform the process. The print data processing unit 34 performs the process on the print data as described above with reference to step S16. When it is determined not to perform the process by the print data processing unit 34, the process control unit 32 skips the process of step S63.

In step S64, the print service providing apparatus 10 sends the print data and the bibliographic data to the image forming apparatus 14. The image forming apparatus 14 performs printing based on the received print data and the bibliographic data.

Here, as illustrated in step S62, whether to perform the process by the print data processing unit 34 is determined again after the mobile terminal 18 requests to print the job in the sequence diagram of FIG. 12. However, whether to perform the process by the print data processing unit 34 may be determined once at either one of when the job is input (see step S15 in FIG. 8) or when performing the pull-printing (step S62). Thus, the processes of steps S62 and S63 of the sequence diagram of FIG. 12 may be omitted. Alternatively, the processes of steps S15 and S16 of the sequence diagram of FIG. 8 may be omitted.

(Example of Table Stored in Data Storage Unit)

FIG. 13 is a view illustrating an example of a structure of a table stored in the data storage unit 35. A table as illustrated in FIG. 13, for example, that includes items such as "ID", "DATA PATH", "JOB NAME", "OWNER", AND "NUMBER OF PAGES" is stored in the data storage unit 35. The "ID" is identification data for management.

The "DATA PATH" is a path to a location at which the print data is stored, and may be URL, for example. The "JOB NAME" is a name of the job. The "OWNER" indicates the user who inputs the job. The "NUMBER OF PAGES" is the number of pages of the job. Here, the table of FIG. 13 illustrates a part of properties of the job, and the table may include items of other job properties.

As described above with reference to step S17, when the determination data that indicates a determined result of the driver is stored in the data storage unit 35, a table stored in the data storage unit 35 is as illustrated in FIG. 14, for example.

FIG. 14 is a view illustrating another example of the structure of the table stored in the data storage unit 35. An item of "DETERMINATION DATA" is added to the table of FIG. 13 in the table of FIG. 14. The table of FIG. 14 stores the determined result of the driver as an example of the determination data. When the determined result of the driver is the supported printer driver 52, "TARGET" is stored as the determination data, for example. On the other hand, When the determined result of the driver is the non-supported printer driver 53, "NON-TARGET" is stored as the determination data, for example.

As such, by storing the determination data that indicates the determined result of the driver in the data storage unit 35, according to the print system 1 of the embodiment, whether to perform the process can be determined when obtaining the job in the pull-printing as well. Thus, according to the print system 1 of the embodiment, it is possible to guarantee the printing quality by the non-supported printer driver 53 when obtaining the job in the pull-printing.

(Variation of Determination Data)

The driver determining unit 33 may determine whether the supported printer driver 52 is used (or designated) at the client terminal 16 or the non-supported printer driver 53 is used (or designated) at the client terminal 16 based on a name of the printer driver, for example.

Figure 15:
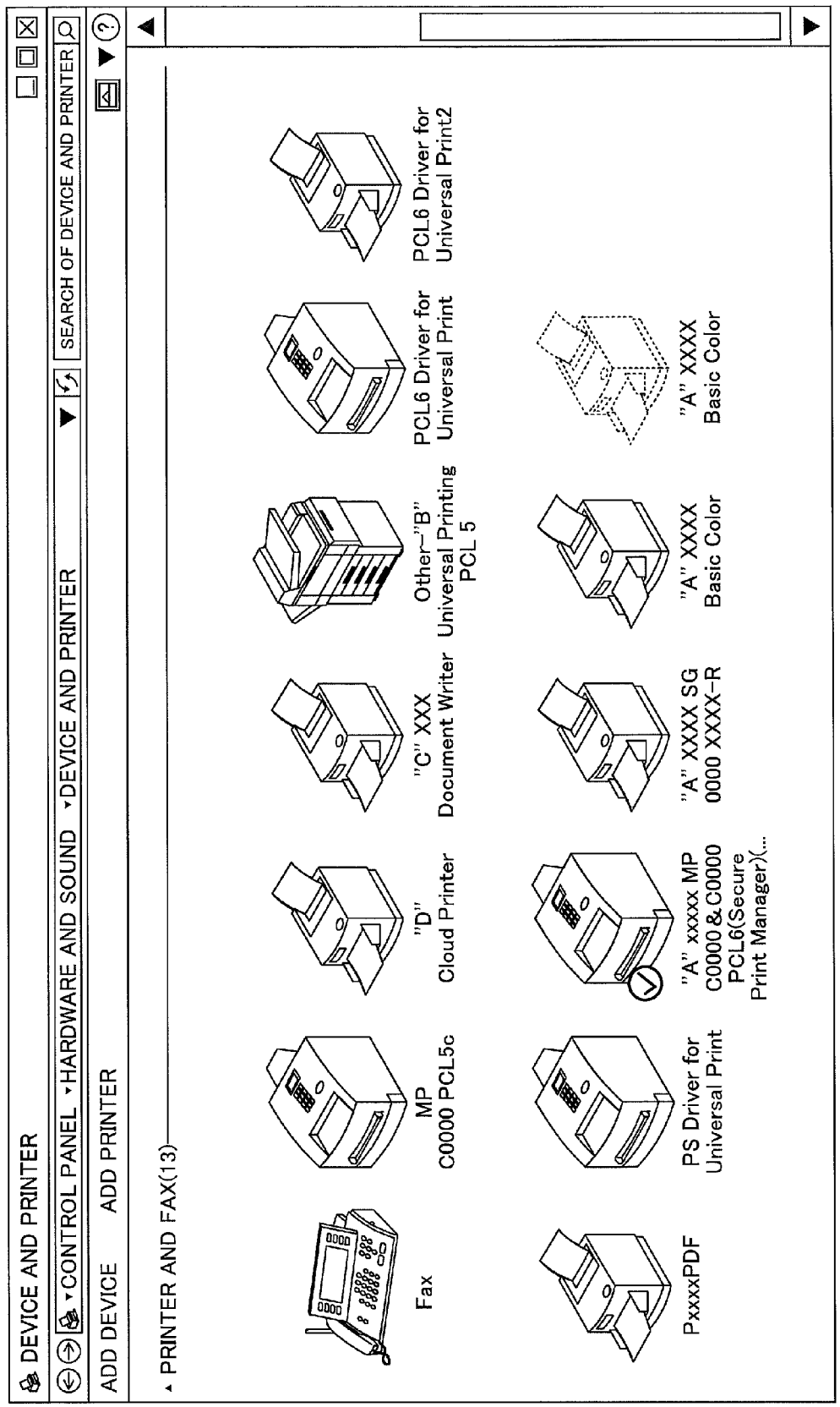
FIG. 15 is an image view illustrating an example of a printer list screen of an OS.

FIG. 15 is an example of an image view of a printer list screen of the OS. The printer list screen of FIG. 15 includes a list of icons of printers, and names of the printers. For example, the driver determining unit 33 may determine whether each of the printers is the image forming apparatus 14 of the other company based on the name of the printer displayed in the printer list screen.

Specifically, the driver determining unit 33 may store names of printers of the same company, and may determine that the non-supported printer driver 53 is used when the name of the printer is other than the names of the printers of the same company.

Further, the driver determining unit 33 may use a fact whether the name of the printer displayed on the printer list screen includes a specific keyword as the determination data. For example, when the name of the printer starts from "Other", the driver determining unit 33 may determine that the printer does not correspond to the target printer driver for the process performed by the print data processing unit 34, and when the name of the printer does not start from "Other", the driver determining unit 33 may determine that the printer corresponds to the target printer driver for the process performed by the print data processing unit 34. As the name of the printer can be set by a user (an administrator or the like), the administrator or the like can arbitrarily set whether to perform the process by the print data processing unit 34 on print data generated by a certain printer driver, regardless of the fact that the actually used printer driver is the supported one or the non-supported one of the print service providing apparatus 10, by using the name of the printer.

Thus, even when the job is printed from the image forming apparatus 14 using the non-supported printer driver 53, if the administrator or the like allows a risk and desires to perform the process by the print data processing unit 34, the administrator or the like should not put "Other" for the name of the printer. In such a case, as the name of the printer does not include "Other", the driver determining unit 33 sends "TARGET" as the determination data that indicates the determined result of the driver to the process control unit 32 even when the non-supported printer driver 53 is actually used.

Further, the driver determining unit 33 may determine that the non-target printer driver (the non-supported printer driver 53, for example) is used when the name of the printer displayed on the printer list screen matches an arbitrary regular expression or a complex condition composed of a plurality of conditions.

Further, the driver determining unit 33 may specify a name of the manufacturer (vendor name) of the printer driver that can be obtained by using API of the OS, and determine that the non-target printer driver (the non-supported printer driver 53, for example) is used when the name of the manufacturer is not registered as the name of the manufacture of the non-target printer driver (the non-supported printer driver 53, for example). Alternatively, the driver determining unit 33 may analyze the print data and determine that the non-target printer driver (the non-supported printer driver 53, for example) is used when the print data cannot be analyzed.

Figure 16:
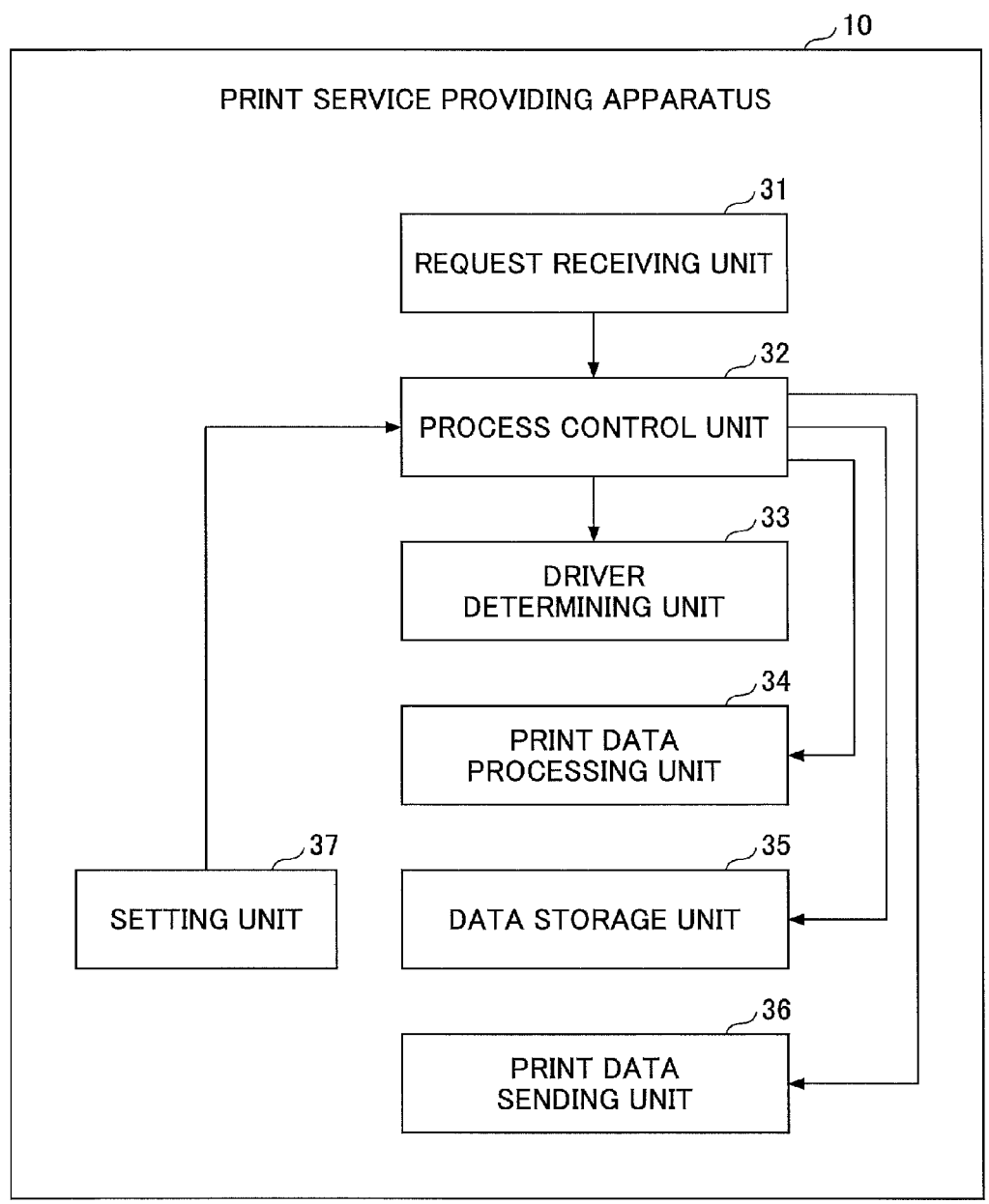
FIG. 16 is a process block diagram illustrating another example of the print service providing apparatus of the embodiment.

The print service providing apparatus 10 may include a plurality of the driver determining units 33 corresponding to the above described variations of the determination data. The print service providing apparatus 10 including the plurality of the driver determining units 33 is actualized by a process block illustrated in FIG. 16, for example. FIG. 16 is a process block diagram illustrating another example of the print service providing apparatus 10 of the embodiment.

The print service providing apparatus 10 of FIG. 16 has a structure in which a setting unit 37 is added to the print service providing apparatus 10 of FIG. 4. The setting unit 37 accepts a setting of selecting one or a plurality of the driver determining units 33 from among the plurality of driver determining units 33 corresponding to the variations of the determination data from a user. The setting unit 37 may be one that uses WebUI or the like, or may be one that uses another tool or the like. By configuring to be capable of selecting one or a plurality of the driver determining units 33 from the plurality of driver determining units 33, convenience of the user is improved in the print system 1 of the embodiment.

(Setting of Process on Job by Non-Target Printer Driver)

Figure 17:
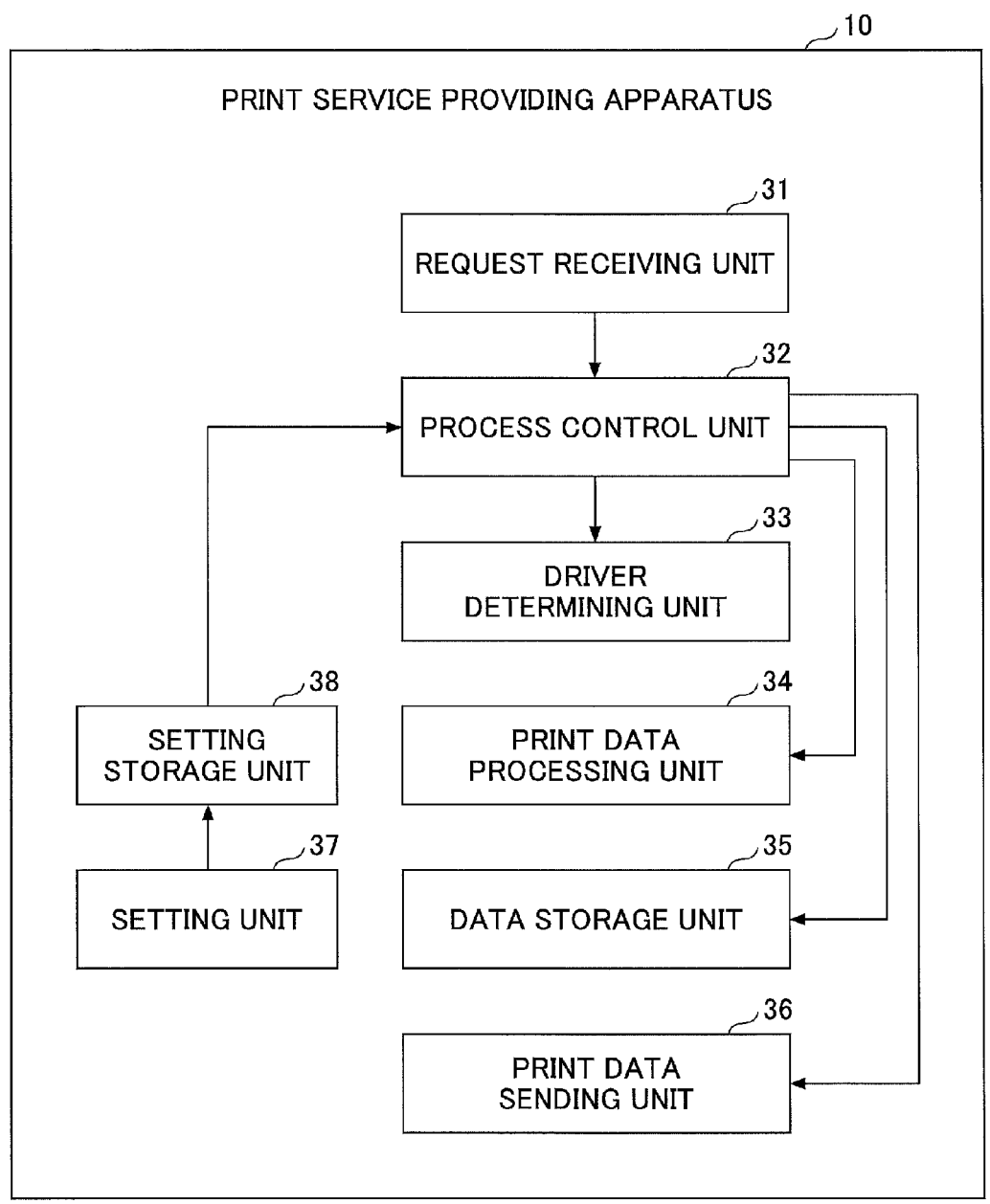
FIG. 17 is a process block diagram illustrating another example of the print service providing apparatus of the embodiment.

As illustrated in FIG. 17, the print service providing apparatus 10 of FIG. 4 may further include the setting unit 37 and a setting storage unit 38. FIG. 17 is a process block diagram illustrating another example of the print service providing apparatus 10 of the embodiment.

The setting storage unit 38 of the print service providing apparatus 10 of FIG. 17 stores a setting of the process performed by the print data processing unit 34, or a substitution process to be performed on the received print data or the like when the process performed by the print data processing unit 34 is determined not to be performed. The setting storage unit 38 may be a RDBMS or the like, or may have a format of storing data of an XML file in a file system or the like. FIG. 18 is a view illustrating an example of an XML file stored in the setting storage unit 38. The XML file of FIG. 18 illustrates an example in which printing cannot be performed for the non-supported printer driver 53, and such a notice is sent by an e-mail. The setting unit 37 accepts a setting to be stored in the setting storage unit 38 from the user.

According to the print service providing apparatus 10 of FIG. 17, a process that does not include processing on the print data (not to permit print, forcible change to pull-printing or the like, for example) can be actualized even for the job by the non-target printer driver such as the non-supported printer driver 53. Here, the process that does not include processing on the print data may be one that is performed in accordance with a rule or the like (not to permit print if the number of pages is greater than or equal to "n" pages or the like, for example).

According to the print service providing apparatus 10 of FIG. 17, by configuring to be capable of setting a substitution process (to terminate printing or the like, for example) even for the job by the non-target printer driver such as the non-supported printer driver 53, a more flexible operation can be performed and convenience of the user is improved.

Figure 19:
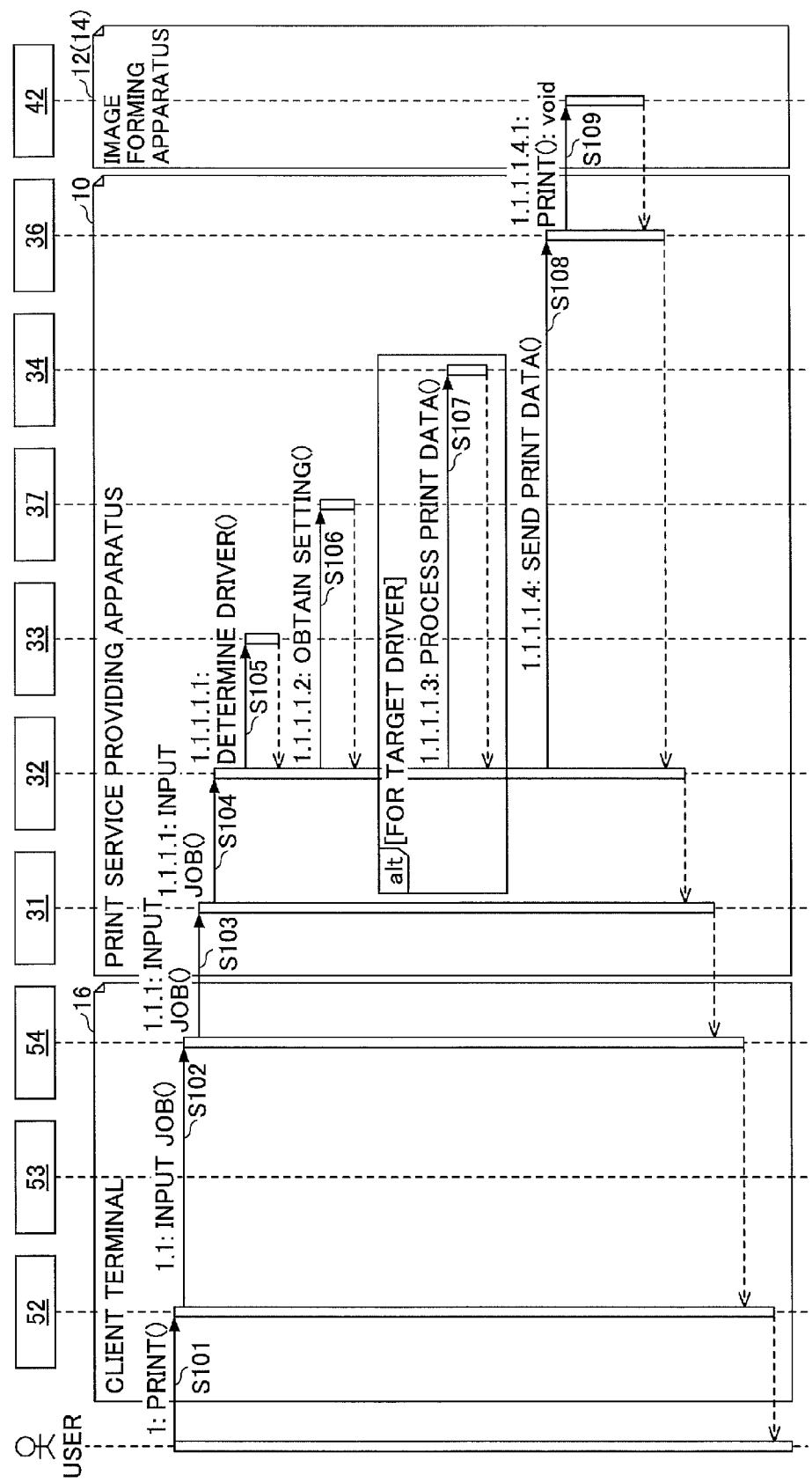
FIG. 19 is a sequence diagram illustrating another example of inputting a job in push-printing.

FIG. 19 is a sequence diagram illustrating another example of inputting a job in push-printing. Here, processes of step S101 to S105 are the same as the processes of step S21 to S25 in FIG. 10. The process control unit 32 obtains a setting of a substitution process capable being performed corresponding to the driver type (non-supported printer driver 53 or the like) from the setting storage unit 38 in step S106.

When it is determined to perform the process by the print data processing unit 34, proceeding to step S107, the process control unit 32 requests the print data processing unit 34 to perform the process. Upon receiving the request to perform the process, the print data processing unit 34 performs the process on the print data. On the other hand, when it is determined not to perform the process by the print data processing unit 34, the process control unit 32 skips the process of step S107, and performs the substitution process capable of being performed set in the setting storage unit 38.

In step S108, the process control unit 32 requests the print data sending unit 36 to send the print data and the bibliographic data to the image forming apparatus 12 or the image forming apparatus 14.

Proceeding to step S109, the print data sending unit 36 sends the print data and the bibliographic data to the image forming apparatus 12 or the image forming apparatus 14. The image forming apparatus 12 or the image forming apparatus 14 performs printing based on the received print data and the bibliographic data.

According to the processes of the sequence diagram of FIG. 19, a more flexible operation is possible even for the job by the non-supported printer driver 53, and convenience of the user is improved.

(Display of Job List)

For the job list displayed on the mobile terminal 18, a job for which a printing quality cannot be guaranteed by the image forming apparatus 12 or the image forming apparatus 14 that prints the job may be removed not to be displayed.

Figure 20:
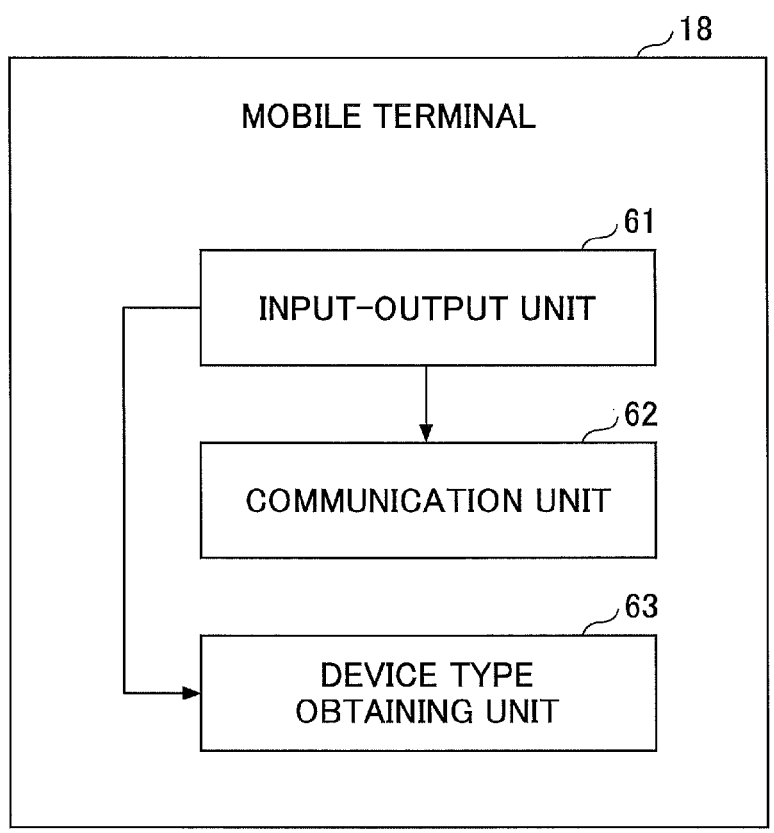
FIG. 20 is a process block diagram illustrating another example of the mobile terminal of the embodiment.
Figure 21:
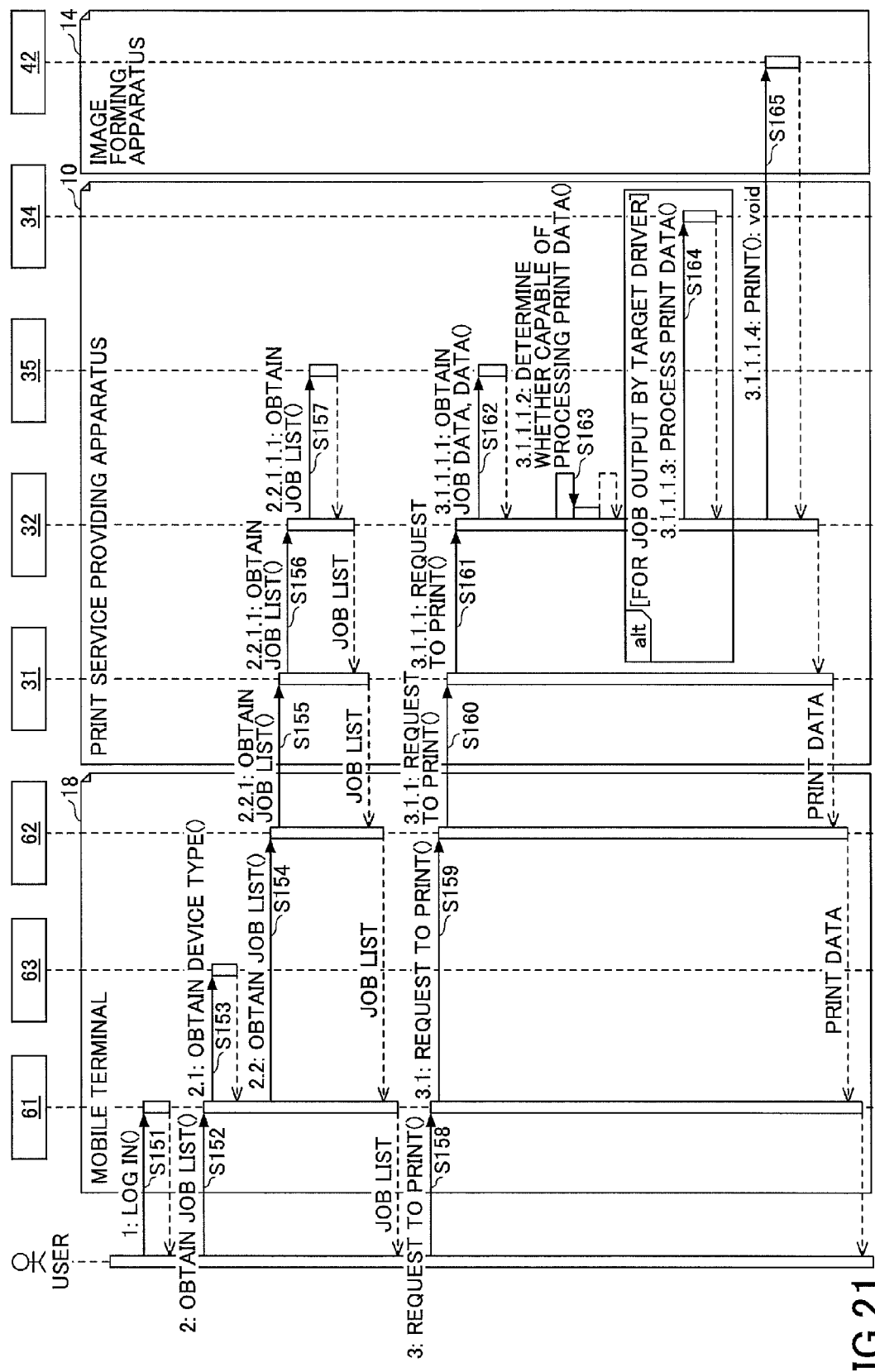
FIG. 21 is a sequence diagram illustrating another example of pull-printing in the image forming apparatus of the other company.

FIG. 20 is a process block diagram illustrating another example of the mobile terminal 18 of the embodiment. The mobile terminal 18 of FIG. 20 has a structure in which a device type obtaining unit 63 is added to the mobile terminal 18 of FIG. 7. The device type obtaining unit 63 obtains a device type of the image forming apparatus 14 of the other company. The device type obtaining unit 63 may be actualized by using a Simple Network Management Protocol (SNMP), WebAPI (Application Programming Interface) or the like. FIG. 21 is a sequence diagram illustrating another example of pull-printing in the image forming apparatus 14 of the other company.

In step S151, a user operates the input-output unit 61 of the mobile terminal 18, and logs in the mobile terminal 18. The process of log-in in step S151 may be performed in cooperation with an authentication service such as LDAP, or may be simply performed by using a personal identification number or the like.

Proceeding to step S152, the user operates the input-output unit 61 of the mobile terminal 18 and requests to obtain a job list. Proceeding to step S153, the input-output unit 61 obtains a device type of the image forming apparatus 14 that performs printing from the device type obtaining unit 63. Proceeding to step S154, the input-output unit 61 requests the communication unit 62 to obtain a job list by designating the device type. Proceeding to step S155, the communication unit 62 requests the print service providing apparatus 10 to obtain the job list in which the device type is designated.

In step S156, the request receiving unit 31 of the print service providing apparatus 10 requests the process control unit 32 to obtain the job list in which the device type is designated. Proceeding to step S157, the process control unit 32 obtains the job list of jobs for which the printing qualities are guaranteed by the image forming apparatus 14 corresponding to the device type from the data storage unit 35. The job list obtained in step S157 is sent to the mobile terminal 18. The input-output unit 61 of the mobile terminal 18 displays the job list of the jobs for which the printing qualities by the image forming apparatus 14 are guaranteed.

Here, as processes of step S158 to S165 are the same as the processes of step S57 to S64 in FIG. 12, the description is not repeated. According to the sequence diagram of FIG. 21, as the jobs for which the printing qualities are not guaranteed by the image forming apparatus 14 that performs printing are not displayed in the job list, the user may not wrongly print such job and convenience of the user is improved.

Although the device type obtaining unit 63 is provided in the mobile terminal 18 in the sequence diagram of FIG. 21, the device type obtaining unit 63 may be provided in the image forming apparatus 14, for example. The image forming apparatus 14 may actualize the function of the device type obtaining unit 63 by an extended function or the like of the device, or may be actualized by application. The device type obtaining unit 63 provided in the image forming apparatus 14 may obtain the device type only once for the first time (when activating), and may use the device type obtained at the first time may be used for the second time or later.

As described above, according to the print system 1 of the embodiment, it is possible to set not to perform the process on the print data of the non-target printer driver such as the non-supported printer driver 53. Further, according to the print system 1 of the embodiment, it is possible for an administrator or the like to set the determination data that indicates whether to perform the process by the print data processing unit 34.

Thus, according to the print system 1 of the embodiment, if the user allows a risk that the printing quality is not guaranteed, it is possible to set to perform the process on the print data of the non-supported printer driver 53.

According to the print system 1 of the embodiment, it is possible to flexibly apply a process targeting the print data of the supported printer driver 52 to the print data of the non-supported printer driver 53.

According to the embodiment, a data processing apparatus capable of flexibly applying a process targeting print data of a specific description format to print data of the other description format is provided.

Although a preferred embodiment of the data processing apparatus (print service providing apparatus 10) and the print system 1 has been specifically illustrated and described, it is to be understood that minor modifications may be made therein without departing from the spirit and scope of the invention as defined by the claims.

The present invention is not limited to the specifically disclosed embodiments, and numerous variations and modifications may be made without departing from the spirit and scope of the present invention. For example, the print data processing unit 34 is an example of a processing unit. The request receiving unit 31 is an example of a receiving unit. The driver determining unit 33 is an example of a determination data obtaining unit. The process control unit 32 is an example of a process control unit. The client terminal 16 is an example of a terminal device. The print service providing apparatus 10 is an example of a data processing apparatus.

The individual constituents of the print system 1 may be embodied by arbitrary combinations of hardware and software, typified by a CPU of an arbitrary computer, a memory, a program loaded in the memory so as to embody the constituents illustrated in the drawings, a storage unit for storing the program such as a hard disk, and an interface for network connection. It may be understood by those skilled in the art that methods and devices for the embodiment allow various modifications.

Further, although boxes of units are given only numerals and names of the units are not illustrated in the boxes in FIGS. 8, 10-12, 19 and 21, the boxes with numerals correspond to the units as illustrated in FIGS. 4-7, 16, 17 and 20 and described in the specification.

What is claimed is:

1. A data processing apparatus comprising:
a processor, and
a memory storing instructions that, when executed, cause the processor to
receive print data and setting data of the print data of a description format selected by a user,
obtain determination data that indicates whether a printer driver used for inputting the received print data and the setting data of the print data is a target printer driver for an editing process performed by a processing method targeting print data of a specific description format on the print data or the setting data, from the received print data and the setting data of the print data,
determine to perform the editing process by the processing method on the received print data or the setting data of the print data, when the printer driver used for inputting the received print data and the setting data of the print data is the target printer driver, while determine not to perform the editing process by the processing method on the received print data or the setting data of the print data when the printer driver used for inputting the received print data and the setting data of the print data is not the target printer driver, and
perform the editing process on the print data or the setting data of the print data by the processing method when it is determined to perform the editing process by the processing method in the determining.

2. The data processing apparatus according to claim 1, wherein the determination data indicates whether the printer driver used for inputting the received print data and the setting data of the print data is a supported printer driver targeting print data of the specific description format.

3. The data processing apparatus according to claim 1, wherein the determination data indicates whether the printer driver used for inputting the received print data and the setting data of the print data is the target printer driver based on a name of the used printer driver.

4. The data processing apparatus according to claim 3, wherein the determination data indicates whether the used printer driver is the target printer driver based on whether the name of the used printer driver includes a previously set predetermined term.

5. The data processing apparatus according to claim 3, wherein the editing process is performed on the received print data or the setting data of the print data based on the determination data indicating that the used printer driver is the target printer driver even when the used printer driver is a non-supported printer driver targeting print data of a description format other than the specific description format.

6. The data processing apparatus according to claim 1, wherein the instructions stored in the memory, when executed, further cause the processor to perform a substitution process on the received print data or the setting data of the print data when it is determined not to perform the editing process on the received print data or the setting data of the print data in the determining.

7. The data processing apparatus according to claim 1, wherein whether to perform the editing process on the received print data or the setting data of the print data is determined based on the obtained determination data when receiving the print data and the setting data of the print data from a terminal device.

8. The data processing apparatus according to claim 1, wherein whether to perform the editing process on the received print data or the setting data of the print data based on the obtained determination data at a timing when sending the print data and the setting data of the print data to an image forming apparatus.

9. The data processing apparatus according to claim 1, wherein the instructions stored in the memory, when executed, further cause the processor to send the print data and the setting data of the print data to an image forming apparatus after performing the editing process on the print data or the setting data of the print data by the processing method when it is determined to perform the editing process by the processing method in the determining.

10. The data processing apparatus according to claim 9, wherein the instructions stored in the memory, when executed, further cause the processor to send the print data and the setting data of the print data to the image forming apparatus without performing the editing process on the print data or the setting data of the print data by the processing method when it is determined not to perform the editing process by the processing method in the determining.

11. The data processing apparatus according to claim 1, wherein the editing process is an editing process on the print data itself, changing user data, a process in accordance with a rule, switching between push-printing and pull-printing, embedding authentication data, changing a print setting, or changing the image forming apparatus to output.

12. A non-transitory computer-readable recording medium having recorded thereon a program that causes a computer to execute a data processing method comprising:
receiving print data and setting data of the print data of a description format selected by a user;
obtaining determination data that indicates whether a printer driver used for inputting the received print data and the setting data of the print data is a target printer driver for an editing process performed by a processing method targeting print data of a specific description format on the print data or the setting data, from the received print data and the setting data of the print data;
determining to perform the editing process by the processing method on the received print data or the setting data of the print data, when the printer driver used for inputting the received print data and the setting data of the print data is the target printer driver, while determining not to perform the editing process by the processing method on the received print data or the setting data of the print data when the printer driver used for inputting the received print data and the setting data of the print data is not the target printer driver; and
performing the editing process on the print data or the setting data of the print data by the processing method when it is determined to perform the editing process by the processing method in the determining.

13. The non-transitory computer-readable recording medium according to claim 12, wherein the data processing method further comprising:
sending the print data and the setting data of the print data to an image forming apparatus after performing the editing process on the print data or the setting data of the print data by the processing method when it is determined to perform the editing process by the processing method in the determining.

14. The non-transitory computer-readable recording medium according to claim 13, wherein the data processing method further comprising:
sending the print data and the setting data of the print data to the image forming apparatus without performing the editing process on the print data or the setting data of the print data by the processing method when it is determined not to perform the editing process by the processing method in the determining.

15. The non-transitory computer-readable recording medium according to claim 12, wherein the editing process is an editing process on the print data itself, changing user data, a process in accordance with a rule, switching between push-printing and pull-printing, embedding authentication data, changing a print setting, or changing the image forming apparatus to output.

16. A print system comprising:
one or more terminal devices;
one or more image forming apparatuses; and
a data processing apparatus, connected with each other via a network to be capable of communication with each other,
wherein each of the terminal devices, on which at least one of a supported printer driver targeting print data of a specific description format and a non-supported printer driver targeting print data of a description format other than the specific description format is mounted, is configured to input print data and setting data of the print data of a description format selected by a user using the supported printer driver or the non-supported printer driver to the data processing apparatus,
wherein the data processing apparatus includes
a processor, and
a memory storing instructions that, when executed, cause the processor to
receive the print data and the setting data of the print data of the description format selected by the user from the terminal device,
obtain determination data that indicates whether a printer driver used for inputting the received print data and the setting data of the print data is a target printer driver for an editing process performed by a processing method targeting print data of a specific description format on the print data or the setting data, from the received print data and setting data of the print data,
determine to perform the editing process by the processing method on the received print data or the setting data of the print data, when the printer driver used for inputting the received print data and the setting data of the print data is the target printer driver, while determine not to perform the editing process by the processing method on the received print data or the setting data of the print data when the printer driver used for inputting the received print data and the setting data of the print data is not the target printer driver,
perform the editing process on the print data or the setting data of the print data by the processing method when it is determined to perform the editing process by the processing method in the determining, and
send the print data and the setting data of the print data to one of the image forming apparatuses after performing the editing process on the print data or the setting data of the print data by the processing method when it is determined to perform the editing process by the processing method in the determining, or send the print data and the setting data of the print data to one of the image forming apparatuses without performing the editing process on the print data or the setting data of the print data by the processing method when it is determined not to perform the editing process by the processing method in the determining,
wherein each of the image forming apparatus is configured to print based on the print data and the setting data of the print data received from the data processing apparatus.

17. The print system according to claim 16, wherein the editing process is an editing process on the print data itself, changing user data, a process in accordance with a rule, switching between push-printing and pull-printing, embedding authentication data, changing a print setting, or changing the image forming apparatus to output.

* * * * *